United States Patent [19]

Gural

[11] Patent Number: 5,297,135
[45] Date of Patent: Mar. 22, 1994

[54] METHOD AND APPARATUS FOR DETERMINING DIRECTIONALITY OF COMMUNICATION SIGNALS ON A COMMUNICATION CHANNEL

[76] Inventor: Kenneth Gural, 7207 Dartmouth Ave., College Park, Md. 20740

[21] Appl. No.: 696,018

[22] Filed: May 6, 1991

Related U.S. Application Data

[63] Continuation of Ser. No. 304,217, Jan. 31, 1989, Pat. No. 5,036,534.

[51] Int. Cl.$^5$ .................... H04J 15/00; H04L 5/14
[52] U.S. Cl. .................... 370/32; 379/390; 379/30
[58] Field of Search .................... 370/32; 375/82; 333/109, 17.1, 17.3; 329/327, 336, 337, 338; 455/79, 80, 81; 379/1, 27, 30, 100, 406, 410, 411, 390

[56] References Cited

U.S. PATENT DOCUMENTS

| | | | |
|---|---|---|---|
| 4,346,261 | 8/1982 | Hestad et al. | 379/390 |
| 4,354,124 | 10/1982 | Shima et al. | 375/82 |
| 4,410,765 | 10/1983 | Hestad . | |
| 4,506,175 | 3/1985 | Reitmeier et al. | 375/82 |
| 4,510,453 | 4/1985 | Sun | 375/82 |
| 4,627,052 | 12/1986 | Hoare et al. | 370/85.13 |
| 4,656,431 | 4/1987 | Chapman | 329/327 |
| 4,746,986 | 5/1988 | Tanigawa | 358/256 |
| 4,788,714 | 11/1988 | Hashimoto | 379/74 |
| 4,800,439 | 1/1989 | Yoshino | 379/100 |
| 4,813,067 | 3/1989 | Hashimoto | 379/67 |
| 4,821,312 | 4/1989 | Horton et al. | 370/102 |
| 4,823,375 | 4/1989 | Yoshida | 379/100 |
| 4,850,008 | 7/1989 | Berg et al. | 379/93 |
| 4,856,049 | 8/1989 | Streck | 379/67 |
| 4,868,865 | 9/1989 | Ogawa et al. | 379/100 |
| 4,879,741 | 11/1989 | Liu | 379/100 |
| 5,117,440 | 5/1992 | Smith et al. | 375/82 |

Primary Examiner—Douglas W. Olms
Assistant Examiner—Chau T. Nguyen
Attorney, Agent, or Firm—PATENTEC

[57] ABSTRACT

In a bidirectional communication channel, the method and apparatus for determining directionality of communication signals using digital techniques. A plurality of independent signals are derived from the communication channel, which signals are analyzed to determine their relative phase(s). The relative phase(s) are then compared with a table of relative phases indicating the directionality of the original signals.

11 Claims, 6 Drawing Sheets

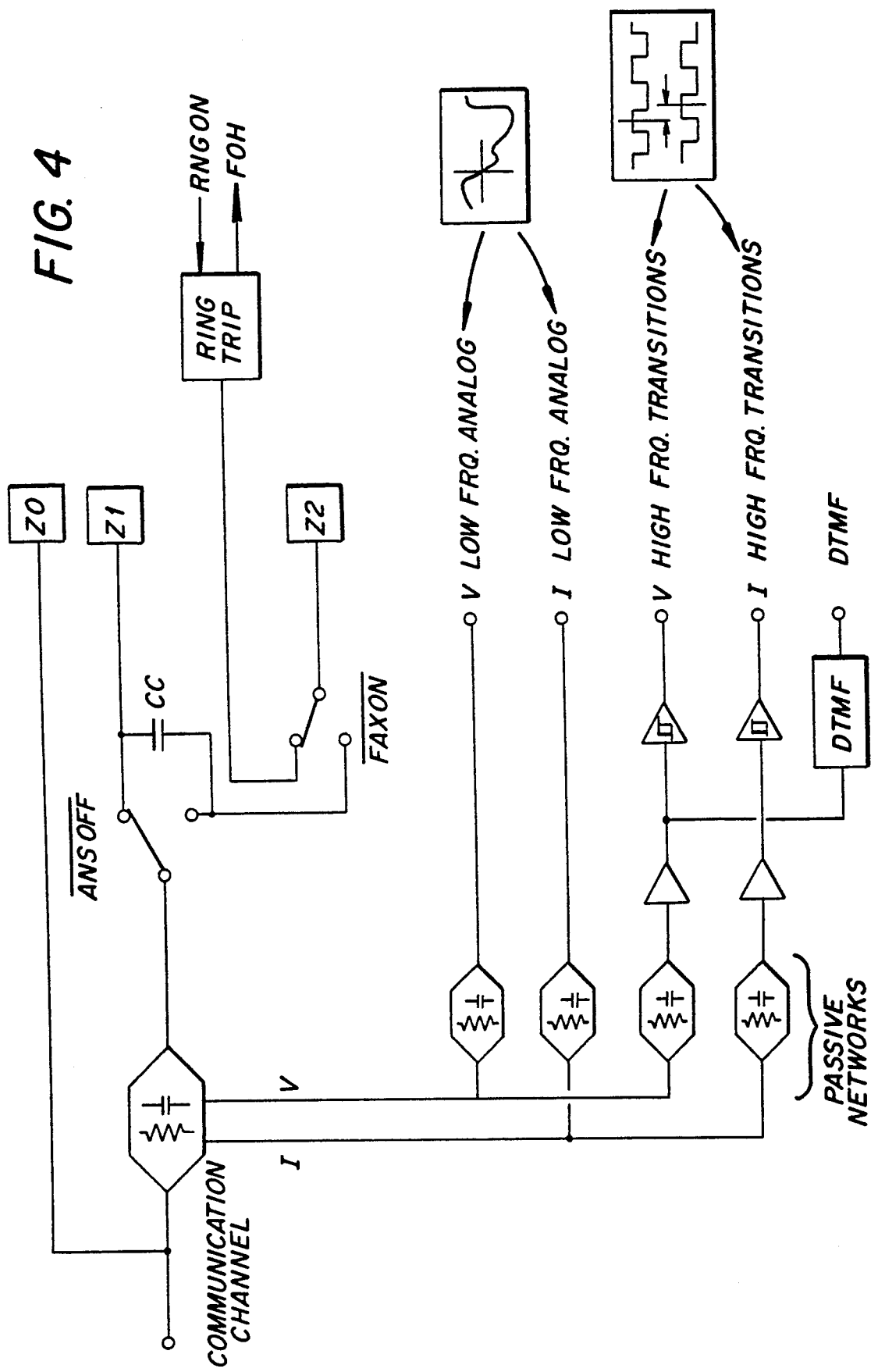

OUT    IN

METHOD AND APPARATUS FOR DETERMINING DIRECTIONALITY OF COMMUNICATION SIGNALS ON A COMMUNICATION CHANNEL

RELATED APPLICATION

This application is a continuation-in-part of application Ser. No. 304,217 filed 31 Sep 1989, now U.S. Pat. No. 5,036,534.

BACKGROUND OF THE INVENTION

U.S. Pat. No. 5,036,534 (the specification of which is incorporated herein by reference, and referred to henceforth as "the prior application") presents methods and apparatus to enable a telephone subscriber to utilize a plurality of previously incompatible telephone device systems on the same telephone line. This is accomplished by allowing a first device system to respond to an incoming telephone call, while monitoring the telephone line to detect various modes of operation of the first device system and to detect an off-mode condition not corresponding to a mode of operation of the first device system; thereupon establishing communication between a second device system and the telephone line, and so forth. In the specific embodiments of the invention discussed within that specification, much of the monitoring functions are effected through analog circuitry, that convert the various signals on the telephone line into a plurality of logical condition signals that are subsequently used by a high-level decision and control microcomputer to carry out the algorithms discussed therein. The instant application, while continuing the general decision and control algorithms of the earlier application, includes specific improvements on the low-level monitoring and control functions disclosed therein. In particular, portions of the monitoring circuitry have been replaced by digital signal processing in such a way as to reliably and effectively convert the various waveforms into logical condition signals. Also, the ring-trip circuitry used to actuate the second (and subsequent) telephone device systems is further streamlined for improved performance. Many of the improvements presented herein may also be of use in other communications applications than just the specific intelligent interface described herein.

Therefore, an object of this invention is to enable any of a large selection of otherwise incompatible communication device systems to be utilized with the same communication line in such a manner as to ensure harmonious operation of each of the systems, through digital signal processing techniques.

Another object of this invention is to enable a communications system to have portions of its analog monitoring circuitry replaced with digital signal processing while maintaining or improving the performance of the system.

Another object of this invention is to develop communication monitoring circuitry and software as subsystems capable of wide applications beyond just the specific applications relating to intelligent telephone interfaces.

These and further objects and features of the invention will become apparent from the following detailed description of preferred embodiments thereof taken in conjunction with the accompanying drawings and the specification of the copending application referenced above.

SUMMARY OF THE INVENTION

Subscriber's intelligent communications interface enabling the harmonious use of otherwise incompatible communication device systems on a communications channel, and method of using. Digital signal processing techniques for monitoring a communications channel to derive characteristic logical condition signals representative of the status of the communications channel and of the waveforms and other low-frequency line characteristics present thereon. Improved ring-trip circuitry providing reliable ring-trip functions with minimal electrical components.

BRIEF DESCRIPTION OF THE DRAWINGS

FIG. 4 shows schematically the major circuitry of the instant invention in the preferred embodiment.

DETAILED DESCRIPTION OF THE PREFERRED EMBODIMENTS

Figure 1:
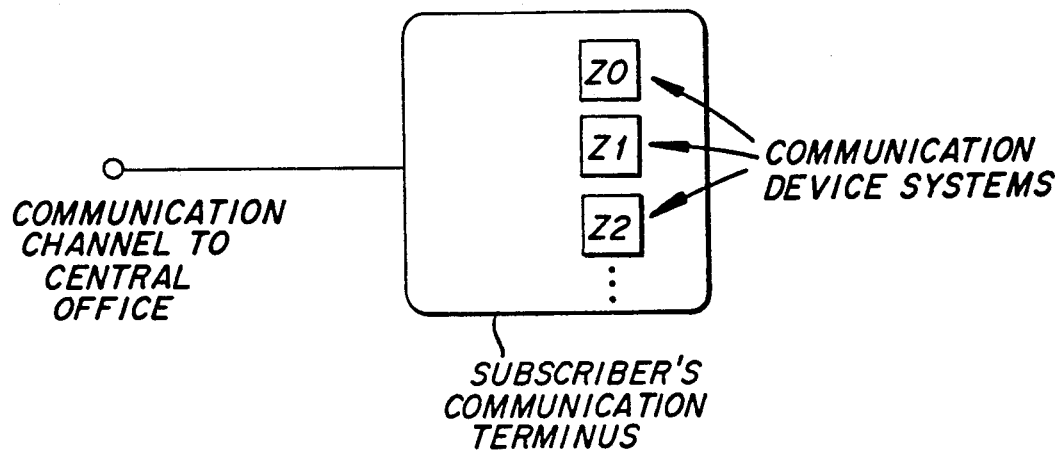
FIG. 1 shows in schematic form a subscriber's communication terminus comprising a plurality of device systems (Z0, Z1, etc.) associated with a communication channel to a central office.

FIG 1 shows a subscriber's communication terminus having a plurality of communication device subsystems Z0, Z1, Z2, etc. (each of which may itself comprise distinct subsystems) that are associated with a communication channel to a central office. If the device subsystems are mutually incompatible, then additional method and means are necessary to enable the plurality of subsystems to harmoniously operate with the communication channel in order to avoid conflicts. Such method and means are presented in the prior application referenced above.

In that application, analog circuitry performs major monitoring functions on the communication channel to derive logical signals subsequently employed by a microcomputer to determine whether or not a conflict is occuring, and if so, to take appropriate action (e.g., actuating a second subsystem and disengaging the first). The structure of the microcomputer program disclosed therein may be presented schematically as in FIG. 2 of the instant application. A plurality of logical signals developed by the external analog circuitry are transformed by a crude digital filter in steps 100-180 into a plurality of clean logical bits (the "logical condition flags") that are compared in step 210 with a desired logical condition flag to determine whether or not action is required. If not, the loop recycles. Otherwise, step 220 determines which state to transfer further processing to, such as ONHOOK steps 1500-1560 etc. In this further processing, a control action may be performed (e.g., turning ON the high voltage ring signal), further coupled with the establishment of new condition flags and possibly a new control state. Then the program resumes with the front end monitoring functions until the new set of condition flags is satisfied.

In the instant invention, much of the external analog circuitry of the prior application has been replaced with front-end, high-frequency digital signal processing. For example, the directionality monitoring is accomplished by comparing the phases of linearly-independent waveform signals derived from the communication channel, rather than by using a linear hybrid (being essentially a linear matrix multiplication of the independent waveform signals) to accomplish the separation of forward and backward signals. The details of such processing is discussed in detail below. In the meantime it may be instructive to view a similar schematic program diagram, FIG. 3, representing the structure of the instant invention, and to compare it to the earlier structure of FIG. 2. The diagram of FIG. 3 corresponds to the computer program entitled "FAXTRAN—II VERSION 3" appended herewith.

Figure 2:
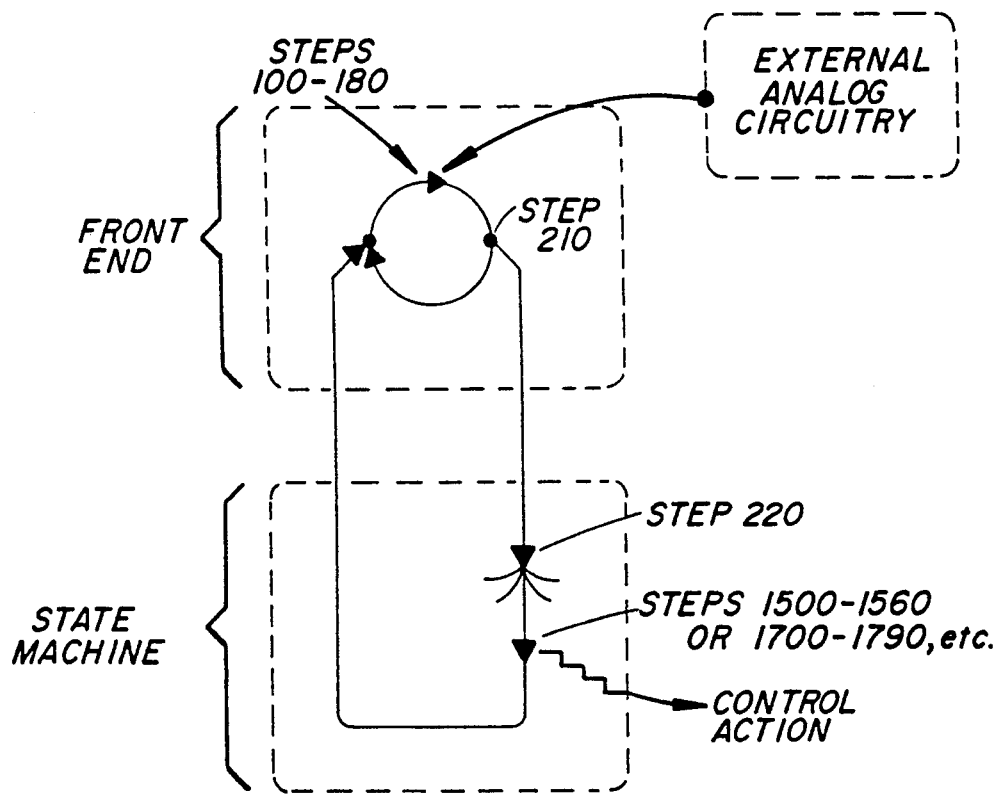
FIGS. 2 and 3 show basic flow structures corresponding to the programs in the prior application and the instant application.
Figure 3:
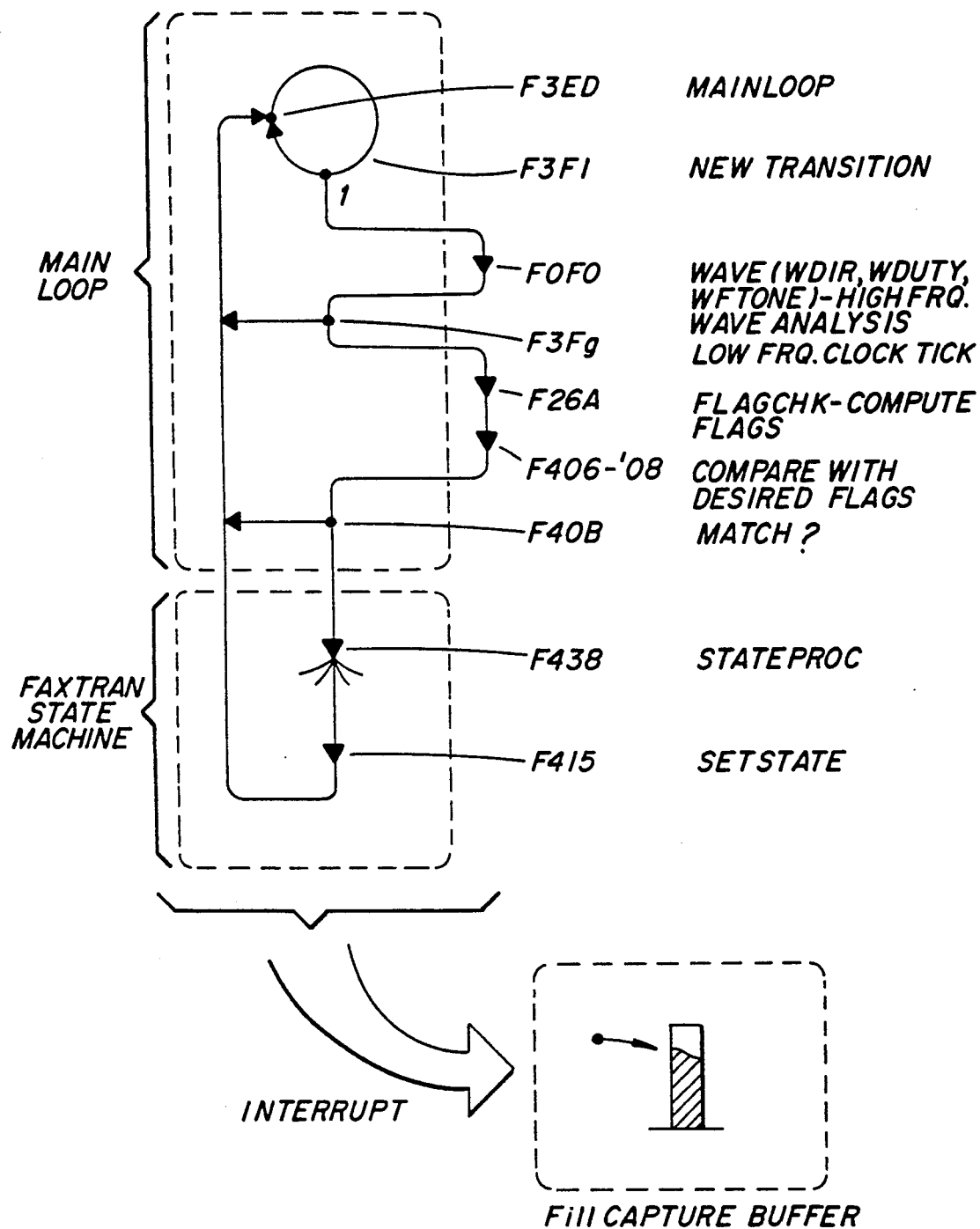

In FIG. 3, the state machine portion of the program remains in form similar to FIG. 2, wherein the state machine is responsive to the instant settings of a plurality of logical condition flags in comparison to previously established desired condition flags. The comparison is performed in step F40B (corresponding to the prior step 210), and upon negative result returns to the front end processing labelled as MAINLOOP. MAINLOOP contains a high frequency loop that in overview continuously monitors the input lines to detect high frequency waveform transitions that require further digital signal processing. In actual detail, MAINLOOP monitors a revolving Capture Buffer which stores the transition times, rather than monitoring the input lines themselves, in order to enable some processing buffering when a large number of transitions arrive in a short time. The Capture Buffer is filled by interrupt routines responsive to the high-frequency transitions.

Once a transition is detected, further high-frequency processing is carried out by the general routine WAVE (and specific subroutines WDIR, WDUTY, WFTONE) which mathematically transform the times associated with the transition (and previous transitions) into a plurality of characteristic variables that are smoothed by a digital filter. This portion of the program may be compared with the steps 100-180 of the prior program that also perform mathematical transform and digital filtering of the input signals. However, the instant program performs more extensive mathematical analysis of the input signals (to be described below) and at a considerably higher frequency.

After performing the mathematical transform and digital filtering, the program then checks if the low-frequency (30.5 msec) clock pulse has occurred. If not, the program returns to the high-frequency cycle in the front end. If so, the program thresholds the digitally filtered characteristic variables (and combines with various clock and other low-frequency variables) to derive a plurality of logical condition flags that are then compared with the desired logical condition flags in step F40B to determine if further action is required (corresponding to step 210 of the prior program). If no action is required, the program recycles to the high frequency front-end loop.

An overview of the circuitry of this application is shown in FIG. 4. In contrast to the prior application, the present intelligent interface has essentially no analog signal processing prior to passing signals to the microcomputer. From the communication channel, two signals representative of voltage and current are passed through simple passive networks to derive the four signals representative of low-frequency V and I, and high-frequency V and I. The high-frequency V and I are further amplified and thresholded to derive binary transition signals to the microcomputer, while the low-frequency V and I are passed directly to the A/D converter in the microcomputer. An additional change from the prior application is the presence of capacitor CC in FIG. 4 which allows AC sound to pass between Z2 and the communication channel while blocking DC voltage for the case where ANSOFF has Z1 connected and FAXON has Z2 connected (i.e., prior to disconnecting Z1). The advantage of this configuration is that signals from and to Z2 may be recorded in Z1 during the ICM (incoming signal mode) without actuating a "remote tel set pick-up" mode in Z1 which would cause Z1 to abruptly terminate.

Because the high-level decision and control actions of the instant application are similar to the prior application, they will not be described in further detail herein. However, reference may be made to the specification of the prior application, and also to the computer program listing appended herewith for a more complete description of the decision and control actions taken in the preferred embodiment of this application.

DIRECTIONALITY DETECTOR

Figure 5A:
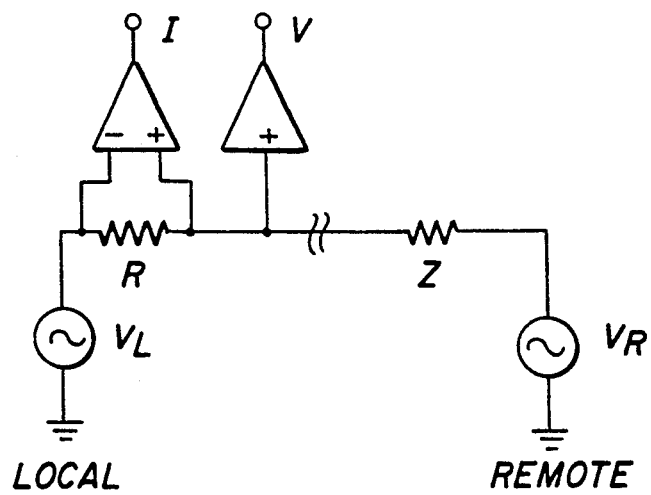
FIGS. 5A-5C show a simple communication channel carrying linearly independent signals.

The decision and control functions of this and the prior application are enhanced by the ability of the interface to distinguish signals travelling in opposite directions on the communication channel. Although it may seem at first impossible to separate two signals on the same communication line, the line actually has two linearly independent variables (eg., voltage and current) which can be combined in some fashion to create the independent signals. The properties of a communication line, although complicated, may be illustrated in their essential aspects by the simple circuit of FIGS. 5A–5C, wherein two signals V and I are derived from a connecting link between two voltage sources and series impedances R and Z. The local source is associated with a purely resistive impedance R, while the remote source is associated with a partly complex impedance Z including the (probably unknown) response of the communication line.

Figure 5B:
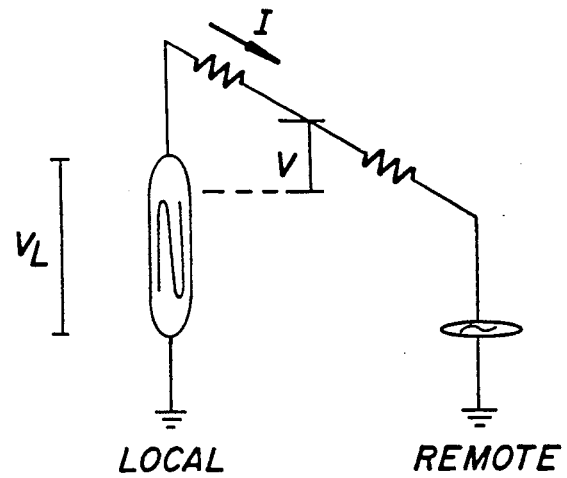
Figure 5C:
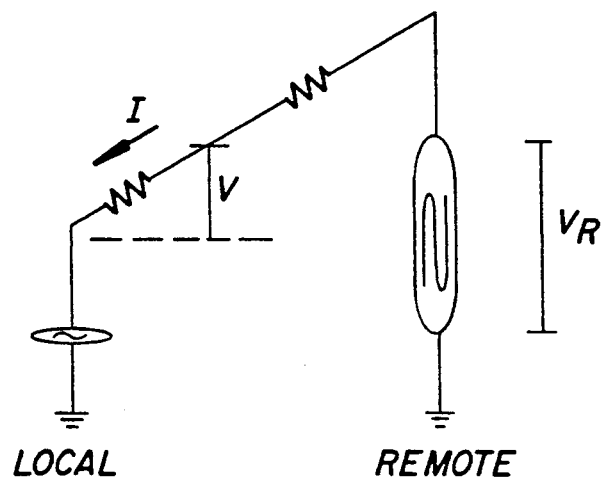

As shown in FIG. 5B, when the local source is transmitting, the current and voltage are measured to be in phase. However, when the remote source is transmitting, as shown in FIG. 5C, the voltage and current are measured to have opposite phase. Thus, with respect to the two transmitting voltages $V_L$ and $V_R$, the two measured signals V and I are mathematically linearly independent. This relationship is shown graphically in FIGS. 6A and 6B for the cases wherein the impedance Z is purely resistive or has a complex component, respectively. In these figures, the outgoing and incoming signals 601 and 602 are indicated by darkened lines in the I-V plane. Although the two measured signals V and I are linearly independent, they are not distinct with respect to the transmitting voltages. Thus, when the local source is transmitted (shown as "OUT" in FIG. 7A), both V and I have a component, and similarly for the case when the remote source is transmitting.

Figure 6A:
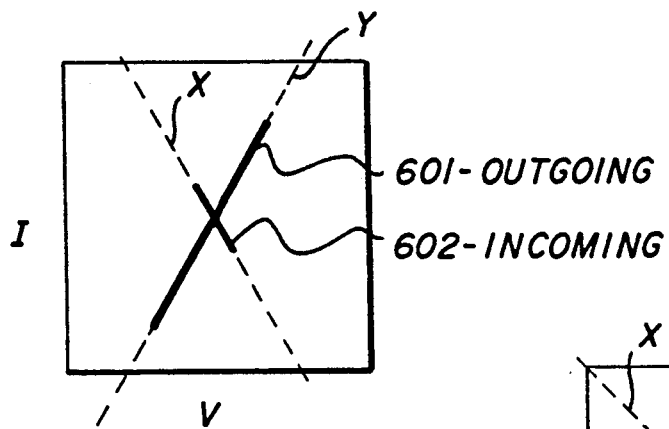
FIGS. 6A-8 show waveforms derived from the signals on the communication channel of FIGS. 5A-5C.
Figure 7A:
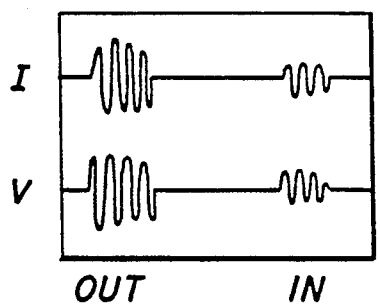
Figure 7B:
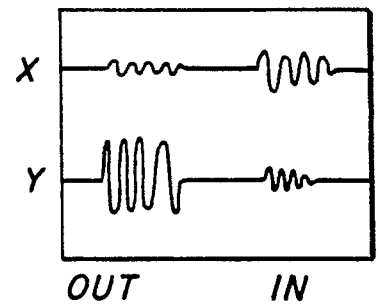

If the complex impedance Z were always purely resistive, then it would be a simple matter to separate the two transmitting signals. As shown in FIG. 6A, if coordinate axes are chosen along the X and Y directions indicated by the dotted lines, and projections of the two signals be taken along those axes, then the sequence of signals illustrated in FIG. 7B would be obtained. This amounts to effectively separating the two transmitting signals, because each transmitting signal produces an effect on virtually only one of X and Y. The hybrid circuit shown in the prior application is an example of the use of a linear transformation (transformation to new coordinate axes) for the purpose of (attempting to) separate the transmitting signals.

Figure 6B:
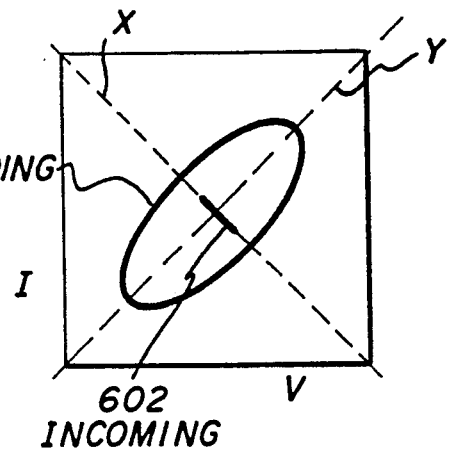
Figure 7C:
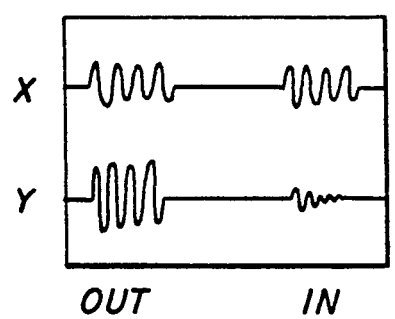

In most cases, however, the impedance Z has a complex component corresponding to the situation represented by FIG. 6B. It should be clear that projection upon the axes X and Y as illustrated in FIG. 7C will not produce pure signals as in the purely resistive case. To address this problem, prior art methods have utilized complex impedances to balance the impedance Z to collapse the elliptical outgoing waveform onto a linear axis, known as side-tone cancellation. The problem is that it is necessary to know the impedance Z exactly in order to cancel the complex component. Thus, complicated measurement or active cancellation systems are required by the prior art methods.

Moreover, even when the complex component of Z can be reduced or eliminated, it is still necessary to know to high accuracy the values of the coordinate transformation components even if purely resistive in order to ensure deriving pure transmitting signals from I and V. Such knowledge is also usually not available. Thus in the prior art it is usually difficult to measure incoming sounds in the presence of outgoing sounds.

Figure 8:
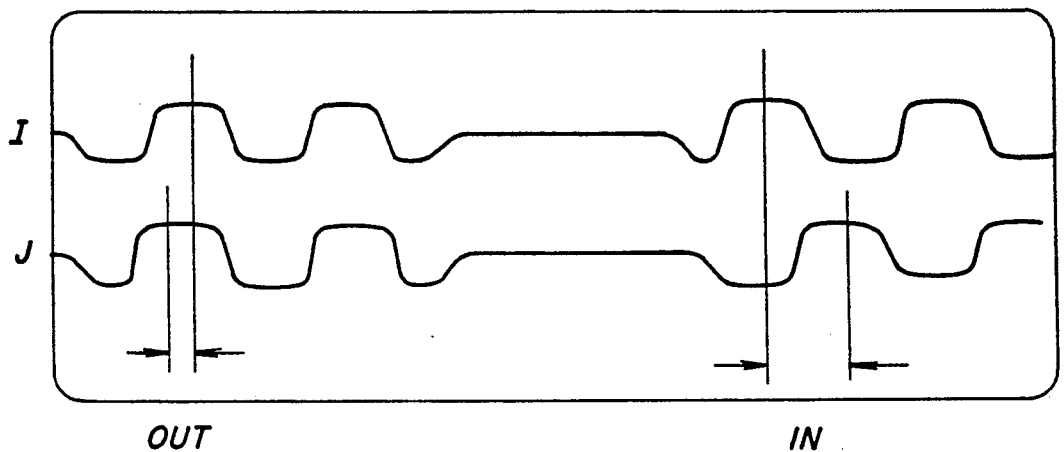

The instant invention makes use of the fact that the signals I and V have opposite phasal characteristics with respect to the transmitting signals, as discussed previously in connection with FIGS. 5A–5C. As shown in FIG. 8, outgoing signals are basically in phase, while incoming signals are in opposite phase. Thus, by comparing the phases of the signals I and V it may be possible to determine whether a signal on the communication channel is incoming or outgoing. U.S. Pat. No. 4,410,765 to A. Hestad et al discloses a directionality detector based upon this principle using analog circuitry and logic gates.

To accomplish the phasal analysis of I and V, the instant invention employs the microcomputer to time the midpoints of the high and low segments of the thresholded waveforms, and to compare these times for each of the I and V signals. The routine to accomplish this analysis, WDIR, occurs at steps F190–F1E3 of the appended program listing. After the relative phase between I and V is computed, the program then decides whether the instant signal should be classified as incoming, outgoing, or indeterminate. This decision is based upon a series of phase thresholds occuring between steps F1C6 and F1E3, and illustrated graphically by the table under step F1C5. A special feature of interest is the fact that although the table is symmetrical with respect to incoming signals about phase 8000 (opposite phase), it is not symmetrical with respect to outgoing signals about phase 0000. This is due to the complex impedance of Z, which tends to delay the voltage of outgoing signals due to capacitance of the lines. It should be remembered, however, that although the thresholds and phase table are presented as the preferred embodiment of this invention, other (e.g., more narrow) phase patterns may also produce useful results although possibly of lesser effectiveness than the phase patterns presented herein. After the program makes a decision regarding the characteristic of the instant signal, the decision is then further smoothed in the digital filtering stages that follow in routines WDUTY and WAVEX.

In greater generality, a communication channel may carry N independent signals, which are partially intermixed; and it may be required to derive N logical signals indicating the presence or lack thereof of each of the original signals. To accomplish the separation of these signals in a linear fashion, an N × N matrix may perform a coordinate transform upon N derived signals to produce N nominally distinct signals; however the discussion of the above case wherein N-2 shows that due to uncertainties of the impedances within the communication channel, it may not be possible to determine the coefficients in the N × N matrix to an acceptable degree. However, it may still be possible to derive from the communication channel a set of N signals that are phasally distinct, meaning that for each transmitted signal, the pattern of phases lies in a unique region in the N-dimensional space of phases ([0,1] × [0,1] × ... × [0,1]). Therefore, by determining the relative phases of each of the derived phasally distinct signals, and performing a decision based upon tables in N-dimensional space, it may be possible to determine which of the N transmitting signals is present, even for a communication channel having varying or unknown impedance characteristics.

RING-TRIP CIRCUIT

Figure 9:
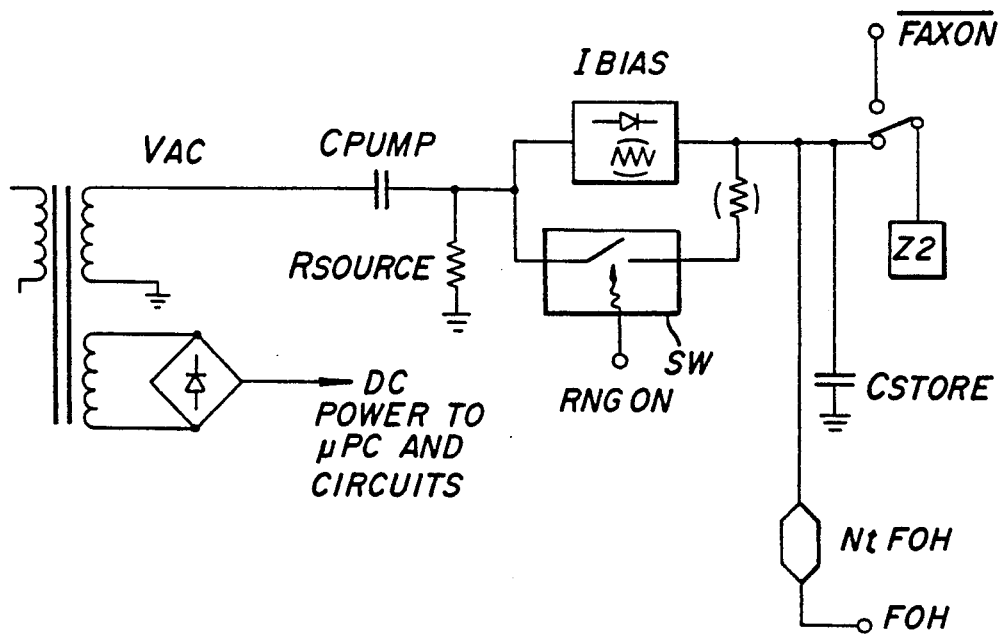
FIG. 9 shows schematically the basic elements in the ring-trip circuit of the instant invention.

The ring-trip circuit used to actuate the device system Z2 in the instant and prior applications has been further refined as shown schematically in FIG. 9. In essence, the circuit comprises a source of high AC voltage Vac, a charge pumping capacitor Cpump, a charge source resistor Rsource, a current bias element Ibias, a switch SW shunting (when closed) part or all of the bias circuit Ibias, and a voltage sensing output FOH connected to the line through a passive network NtFOH. Optional Cstore provides smoothing capacitance for the line.

In operation, Cpump, Rsource, and Ibias combine to provide a DC voltage to the line when SW is open. When SW is closed by signal RNGON, most or all of Ibias is shorted, thereby allowing the high voltage AC to pass through Cpump to Z2. The characteristics of the line voltage are sensed by the A/D input of the microcomputer through the network NtFOH and are sampled at the low frequency clock rate (30.5 msec). A tiny histogram (4 bins) is compiled of the measured voltages according to the offset and histogram definitions in table ONFHTBL3 (F35C). After a certain number of samples, the histogram is analyzed (steps F3A6 - F3B3) in conjunction with the histogram threshold ANA2FL (F368) to determine if the device Z2 is offhook.

LOW-FREQUENCY LINE CHARACTERISTICS

The same analog signal processing described above in conjunction with the ring-trip circuit is also used to analyze the low-frequency characteristics of the communication line. The low-frequency signals I and V from FIG. 4 are passed to the A/D inputs of the microcomputer and sampled at the low-frequency rate (30.5 msec). A 4-bin histogram is compiled of each signal, and used to determine the line characteristics. In steps F371 to F390, the program makes a decision according to the first signal (V) as to whether the line is ringing, pulse dialing, onhook, offhook, or disconnected. In steps F392 to F39F, the program decides according to the second signal (I) if device system Z1 is offhook or onhook.

SUMMARY

Disclosed herein and in conjunction with the prior application is an intelligent communications interface and method of using which employs digital signal processing to monitor a communication channel in order to perform high-level decision and control of a plurality of previously incompatible communications device systems. Particular subsystems and subroutines developed therewith may also have a more universal application as well. Although the preferred system and method of operation are disclosed herein and in the prior application for the purposes of illustrating the principles of the invention, it should be recognized that numerous modifications based upon these inventive disclosures may be carried out by those skilled in the art, and that the invention should not be limited by the explicit embodiments described, but only by the claims that follow hereafter.

```
FAXTRAN--II VERSION 3

Copyright 1991 Kenneth Gural

The computer program presented herein may be graphically
                    reproduced to a limited extent for purposes of study and
                    analysis in order to understand the principles of this
                    invention; but may not be used in whole or in part for
                    any other purposes without written consent of the copyright
                    owner.

Written for the Motorola M68HC11 family of microcomputers, to provide
              the digital signal processing and decision algorithms for the FAXTRAN-II
              voice/fax switch, allowing a fax (or other automatic device) and an
              answering machine and/or other telephone sets/devices to share the same
              telephone line. This version written for a generic M68HC11 device having
              at least the following general memory map:

0000 - 00FF     RAM
              1000 - 103F     I/O and Timer Registers
              F000 - FFFF     PROM or ROM

- - - - - - - - - - - - - - - - - - - - - - - - - - - - - - - - - - - - - - -

TABLE OF CONTENTS and overview of this program:

0) Register Assignments for RAM and I/O

1) Interrupts and I/O Capture Routines
                 Store high freq. waveform and timer event times in the
                 revolving Capture Buffer.

2) High Frequency Waveform Processing Routines:
                 Digitally analyze the high freq. events in order to extract
                 characteristics of the waveforms, for subsequent digital
                 smoothing by a digital smoothing filter.
                 2a)   Entry/ Exit
                 2b)   Directionality Extraction
                 2c)   Voice/Tone Extraction
                 2d)   1100 Hz Extraction
                 2e)   Digital Smoothing Filter 3) Low Frequency (30.5 msec) Processing Routines:
                 Compare smoothed, extracted characteristics with thresholds
                 to derive logical condition flags. Perform analog histograms,
                 and compare with thresholds.
                 3a)   Threshold comparisons
                 3b)   Analog input routines
                 3c)   Threshold comparisons of analog histograms 4) MAIN CONTROL LOOP
                 Checks Capture Buffer for new event (including 30.5 msec flag)
                 and jumps to High Frequency or Low Frequency Routines to
                 process the event. Compares resulting logical condition flags
                 with the desired condition flags. If match, jumps to State
                 Machine routines to process the state change event. Else,
                 checks if new character to be displayed, and if so, JSR's to
                 display routines. Then, recycles loop.

5) FAXTRAN State Machine
                 Performs high-level decision and control responsive to the logical
                 condition flags derived above representing the various waveform and
                 analog characteristics. Sets timer flags and new desired logical
                 condition flags for future events, and sends comments to the LCD
                 display.

6) Display Routines
                 Driver for the LCD display.

7) Display Messages

0) REGISTER ASSIGNMENTS for RAM and I/O

Page 0 RAM registers:

ORG     $00

0000         STACKRM    RSV     $60            ' system stack
```

```
0060  00 00        CAPBUFPTR    DW    $0000          ' capture buffer pointer
0062  00 00        WAVEPTR      DW    $0000          ' capture buffer readout pointer 0064  00 00        WAVETIMEH    DW    $0000          ' upper word of transition time
0066  00 00        WAVEPERIOD   DW    $0000          ' duration of transition cycle
0068  00 00        WAVE1LST1    DW    $0000          ' previous transition, ch1 (V)
006A  00 00        WAVE1LST2    DW    $0000          '   2nd previous transition, ch1
006C  00 00        WAVE2LST1    DW    $0000          ' previous transition, ch2 (I)
006E  00 00        WAVE2LST2    DW    $0000          '   2nd previous transition, ch2
0070  00           WAVE2TRANS   DB    $00            '   transition flag, ch2
0071  00                        DB    $00

0072  00 00        TIMERVH      DW    $0000          ' higher timer regs, incr by timoflo
0074  00 00        TIMERH       DW    $0000

0076  00           TEMP00       DB    $00            ' temporary registers
0077  00           TEMP01       DB    $00
0078  00           TEMP02       DB    $00
0079  00           TEMP03       DB    $00

'
                  '   Digital filter registers
                  '
                   CHGPARB      EQU    .

007A  00           DIRFLG       DB    $00            ' directionality flag

DIGIREGB     EQU    .
007B  00 38 40     VOICEI       DB    $00, $38, $40
007E  00 15 30     TONEI        DB    $00, $15, $30
0081  00 20 30     VOICEO       DB    $00, $20, $30
0084  00 20 30     TONEO        DB    $00, $20, $30
0087  00 20 30     VOICEN       DB    $00, $20, $30
008A  00 20 30     TONEN        DB    $00, $20, $30
008D  00 20 60     FAXTONE      DB    $00, $20, $60
0090  00 01 10     DTMF         DB    $00, $01, $10

0093  00 20 30     QUIETI       DB    $00, $20, $30
0096  00 20 30     QUIETO       DB    $00, $20, $30

0099  7D 00        DUTYTHRES    DW    $7D00
009B  03           ONHKMD       DB    $03            ' mode: ans only; fax only; auto '
                  '   Logical condition flags
                  '
009C  00           SOUNDFLG     DB    $00            ' flag for sound in/out; faxtone
009D  00           QUIETFLG     DB    $00            ' flag for quiet in/out 009E  00           ANAFLG       DB    $00            ' flag for ring, onhook, offhook, etc.
                   FLGHIGH      EQU   ANAFLG
009F  00           FLGLOW       DB    $00            ' flag for misc. conditions
00A0  00 00        FLGCONDTN    DW    $0000          ' desired flag in state table
00A2  00 00        FLGADDR      DW    $0000          ' address of detailed flags in state table 00A4  00 00        TIME1        DW    $0000          ' timer alarms
00A6  00 00        TIME2        DW    $0000

CHGPARME     EQU    .

'
                  '   Other miscellaneous flags and counters
                  '
00A8  00           DDISPCTR     DB    $00            ' misc. flags and counters
00A9  00 00        RINGCTR      DB    $00, $00
00AB  00           FAXRINGCTR   DB    $00
00AC  00           FAXTONDET    DB    $00
00AD  00           DTMFCTR      DB    $00
00AE  00           T30MSECFLG   DB    $00

'
                  '   Analog histogram buffers
                  '
00AF  00 00 00 00  ANA0         DW    $0000, $0000   ' analog histogram buffers:
00B3  00 00 00 00  ANA1         DW    $0000, $0000   '    Line Voltage
00B7  00 00 00 00  ANA2         DW    $0000, $0000   '    Line Current
00BB  00 00 00 00  ANA3         DW    $0000, $0000   '    Fax Line Current 00BF  00           ANACTR       DB    $00            ' number of 30.5 msec blocks '
                  '   Display pointers and buffer
                  '
00C0  F9 4B        DISPTR       DW    M_FAXTRAN      ' display pointer
00C2  F9 4B        DISBUFPTR    DW    M_FAXTRAN      ' display buffer pointer
00C4  00           DISBUF       DB    0              ' buffer for variable message display
00C5                            RSV   20

'
                  '   Capture Buffer
                  '
                                ORG   STACKRM + $0100

MINCAPADR    EQU    .             ' capture buffer
0100                            RSV   $0100
                   MAXCAPADR    EQU    .

'
                  '
                  '   I/O Registers
                  '
                   IOPORT       EQU   $1000          ' capture port A direct inputs:
                                                     '    A04  DTMF   Touch Tone Detector
                                                     '    A02  I      High Frequency Current Transitions
                                                     '    A01  V      High Frequency Voltage Transitions PORTD        EQU   $1008          ' control outputs for external devices:
                                                     '    D20  CLKON--   Click Signal
```

```
                                                       '  D10  RNGON--      High Voltage Ring Signal
                                                       '  D08  ANSOFFINV--  First Tel. Device Relay
                                                       '  D04  FAXONINV--   Second Tel. Device Relay

PORTDDIR    EQU     $1009

TIMER       EQU     $100E          '  timer, lowest word

'  I/O capture time regs:
                    IC1REG      EQU     $1010          '    A04  DTMF
                    IC2REG      EQU     $1012          '    A02  I
                    IC3REG      EQU     $1014          '    A01  V
                    OC2REG      EQU     $1018          '    wave timeout INCAPCTL    EQU     $1021          '  input capture control register
                    INCAPEDG    EQU     $1F             '  edges 2 & 3, rise and fall trigger;
                                                       '  edge 1, rise trigger CAPINTREG   EQU     $1022          '  interrupt mask register
                    CAPINTMSK   EQU     $43             '  OC2, IC2, IC3 enable
                    CAPFLGREG   EQU     $1023          '  flags for i/o cap; write 1 to reset TIMINTREG   EQU     $1024
                    TIMINTMSK   EQU     $80             '  timer overflow enable
                    TIMFLGREG   EQU     $1025          '  timer flags; write 1 to reset BAUD        EQU     $102B          '  SCI regs (used for system diagnostics)
                    SCCR1       EQU     $102C
                    SCCR2       EQU     $102D
                    SCSR        EQU     $102E
                    SCDR        EQU     $102F PORTE       EQU     $100A          '  pins for A/D inputs-- not used for logical input:
                                                       '    E10  ADR4--
                                                       '    E08  ADR3--      Fax Line Current
                                                       '    E04  ADR2--      Line Current
                                                       '    E02  ADR1--      Line Voltage
                                                       '    E01  ANACTRL--   (not used)
                    ANACTRL     EQU     $1030          '  analog input value registers:
                    ADR1        EQU     $1031          '    Line Voltage
                    ADR2        EQU     $1032          '    Line Current
                    ADR3        EQU     $1033          '    Fax Line Current
                    ADR4        EQU     $1034
                    '
                    '
                    '
                    '   Interrupt Vectors
                    '
                                ORG     $FFC0

FFC0                            RSV     $16
FFD6  F0 B2         VSCI        DW      JRTI
FFD8  F0 B2         VSPI        DW      JRTI
FFDA  F0 B2         VPAIE       DW      JRTI
FFDC  F0 B2         VPAO        DW      JRTI
FFDE  F0 37         VTOF        DW              TIMOFLO     '  Timer Low Word overflow
FFE0  F0 B2         VTOC5       DW      JRTI
FFE2  F0 B2         VTOC4       DW      JRTI
FFE4  F0 B2         VTOC3       DW      JRTI
FFE6  F0 7D         VTOC2       DW              IC3LATE     '  No transitions occurred
FFE8  F0 B2         VTOC1       DW      JRTI
FFEA  F0 80         VTIC3       DW              IC3TRANS    '  V transition
FFEC  F0 85         VTIC2       DW              IC2TRANS    '  I transition
FFEE  F0 B2         VTIC1       DW      JRTI
FFF0  F0 32         VRTI        DW      JRTI
FFF2  F0 32         VIRQ        DW      JRTI
FFF4  F0 ED         VXIRQ       DW              XIRQ        '  (used for system diagnostics)
FFF6  F0 32         VSWI        DW      JRTI
FFF8  F0 32         VILOP       DW      JRTI
FFFA  F0 32         VCOP        DW      JRTI
FFFC  F0 32         VCLM        DW      JRTI
FFFE  F0 0B         VRST        DW              MSTINIT     '  System Reset
                    VEND        EQU     .

'
                    '_____
                    '
                    '   1) INTERRUPT ROUTINES
                    '
                    '- - - - - - - - - - - - - - - - - - - - - - - - - - - - - - - -
                    '
                    '   System low-level initialize upon system RESET
                    '
                                ORG     $F000

ORIGINIT    EQU     .

F000  CE E0 00                  LDX     #$E000          '  reset the reset vector to BUFFALO
F003  FF BF FE                  STX     $BFFE           '    (used for system diagnostics)
F006  86 01                     LDAA    #$01
F008  B7 40 00                  STAA    4000            '  host terminal

MSTINIT     EQU     .               '  BEGINNING OF PROGRAM

F00B  8E 00 5F                  LDS     #$5F            '  setup stack pointer

F00E  4F                        CLRA                    '  set up timer overflow enable and regs
F00F  5F                        CLRB
F010  DD 72                     STD     TIMERVH
F012  DD 74                     STD     TIMERH
F014  86 80                     LDAA    #TIMINTMSK
F016  B7 10 25                  STAA    TIMFLGREG
F019  B7 10 24                  STAA    TIMINTREG F01C  8D 48                     BSR     IOCLR           '  turn off capture interrupts
```

```
F01E  86 30              LDAA    #$30            ' setup SCI
F020  B7 10 2B           STAA    BAUD
F023  86 0C              LDAA    #$0C
F025  B7 10 2D           STAA    SCCR2

F028  BD F8 00           JSR     DISPINIT        ' setup display
F02B  BD F2 E4           JSR     ANALOGINIT      ' reset analog inputs F02E  4F                 CLRA
F02F  06                 TAP                     ' clear X mask
F030  0E                 CLI
F031  BD F0 4F           JSR     IOSET
F034  7E F4 52           JMP     ONHHK
'--------------------------------------------------
'
'   Timer low word overflow (30.5 msec)--
'       increment higher words (TIMERH and TIMERVH)
'       place marker in Capture Buffer
'
                 TIMOFLO   EQU     .             ' interrupt routine for timer overflow (30.5 msec)
F037  DE 74              LDX     TIMERH
F039  08                 INX
F03A  DF 74              STX     TIMERH
F03C  26 05              BNE     TRT1
F03E  DE 72              LDX     TIMERVH
F040  08                 INX
F041  DF 72              STX     TIMERVH
F043  86 80     TRT1     LDAA    #TIMINTMSK      ' reset overflow flag
F045  B7 10 25           STAA    TIMFLGREG
F048  D6 73     TRT2     LDAB    TIMERVH +1      ' save in A for TOFL flag
F04A  18 DE 74           LDY     TIMERH
F04D  20 4C              BRA     BUFFILLEX       ' place in Capture Buffer
'--------------------------------------------------
'
'   High Frequency Transition Capture Routines
'       On V, I (IC3, IC2)--    reset timeout (OC2); place trans. in Capture Buffer
'       On timeout (OC2)--      place marker in Capture Buffer
F04F  8D 1D     IOSET    BSR     OC2SET          ' set OC2 capture time
F051  CE 01 00           LDX     #MINCAPADR      ' set buffer pointer
F054  DF 60              STX     CAPBUFPTR
F056  DF 62              STX     WAVEPTR F058  86 1F              LDAA    #INCAPEDG
F05A  B7 10 21           STAA    INCAPCTL
F05D  86 43              LDAA    #CAPINTMSK      ' turn on interrupts
F05F  B7 10 23           STAA    CAPFLGREG
F062  B7 10 22           STAA    CAPINTREG
F065  39                 RTS F066  4F        IOCLR    CLRA                    ' turn off capture interrupts
F067  B7 10 23           STAA    CAPFLGREG
F06A  B7 10 22           STAA    CAPINTREG
F06D  39                 RTS
'
'
F06E  FC 10 0E  OC2SET   LDD     TIMER           ' reset transition timeout
F071  C3 13 88           ADDD    #$1388          ' 2.5 ms delay (200 Hz trap)
F074  FD 10 18           STD     OC2REG
F077  86 40              LDAA    #$40
F079  B7 10 23           STAA    CAPFLGREG       ' clear flag, if any
F07C  39                 RTS
'
'
'
F07D  18 FE 10 18  IC3LATE  LDY   OC2REG         ' transition timeout ocurred
F081  8D EB              BSR     OC2SET
F083  20 10              BRA     ICTRANS
'
'
'
              IC1TRANS                           ' (not used)
'
F085  18 FE 10 12  IC2TRANS LDY   IC2REG         ' channel I
F089  86 02              LDAA    #$02
F08B  20 08              BRA     ICTRANS F08D  18 FE 10 14  IC3TRANS LDY   IC3REG         ' channel V
F091  8D DB              BSR     OC2SET
F093  86 01              LDAA    #$01

F095  B7 10 23  ICTRANS  STAA    CAPFLGREG       ' clear flag bit
F098  F6 10 00           LDAB    IOPORT
'
'
'
F09B  BD F0 B3  BUFFILLEX JSR    BUFFILL         ' fill buffer
F09E  F6 10 22  BFX2     LDAB    CAPINTREG       ' check for other interrupts
F0A1  F4 10 23           ANDB    CAPFLGREG
F0A4  27 0C              BEQ     BFRTI F0A6  C5 02              BITB    #$02
F0A8  26 DB              BNE     IC2TRANS
F0AA  C5 01              BITB    #$01
F0AC  26 DF              BNE     IC3TRANS
F0AE  C5 40              BITB    #$40
F0B0  26 CB              BNE     IC3LATE

JRTI       EQU     .
F0B2  3B        BFRTI    RTI
'
```

```
'    Place [D,Y] into revolving Capture Buffer at location CAPBUFPTR
'        D = [transition flag|IOPORT]
'        Y = transition time
'
F0B3  DE 60           BUFFILL    LDX    CAPBUFPTR
F0B5  BC 02 00                   CPX    #MAXCAPADR
F0B8  25 03                      BCS    BFX1
F0BA  CE 01 00                   LDX    #MINCAPADR
                      BFX1       EQU    .

F0BD  ED 00                      STD    $0,X
F0BF  18 8F                      XGDY
F0C1  ED 02                      STD    $2,X
F0C3  C6 04                      LDAB   #$04
F0C5  3A                         ABX
F0C6  DF 60                      STX    CAPBUFPTR

F0C8  9C 62           BFX2       CPX    WAVEPTR        ' check for overflow
F0CA  27 0B                      BEQ    WAVEOFLO
F0CC  BC 02 00                   CPX    #MAXCAPADR
F0CF  26 05                      BNE    BFXRTS
F0D1  CE 01 00                   LDX    #MINCAPADR
F0D4  20 F2                      BRA    BFX2

F0D6  39              BFXRTS     RTS
'
'
                      WAVEOFLO   EQU    .

F0D7  C6 04                      LDAB   #$04           ' increment pointer again
F0D9  3A                         ABX
F0DA  BC 02 00                   CPX    #MAXCAPADR     ' check for strictly >
F0DD  23 03                      BLS    WVOF2
F0DF  CE 01 04                   LDX    #MINCAPADR + 4

F0E2  DF 60           WVOF2      STX    CAPBUFPTR
F0E4  86 C0                      LDAA   #$C0           ' oflo flag + timeh + timel in buffer
F0E6  D6 73                      LDAB   TIMERVH +1
F0E8  18 DE 74                   LDY    TIMERH
F0EB  20 C6                      BRA    BUFFILL
'
' - - - - - - - - - - - - - - - - - - - - - - - - - - - - - - - - -
'
'    XIRQ -- Unmaskable interrupt
'            (used for system diagnostics)
'
                      XIRQ       EQU    .

(remainder of code deleted from this listing)

'
'    SCI Routines
'        (used for system diagnostics)
'
              (remainder of code deleted from this listing)
'_____
'
'    2) HIGH FREQUENCY WAVEFORM PROCESSING ROUTINES
'         Digitally analyze the high freq. events in order to extract
'         characteristics of the waveforms, for subsequent digital
'         smoothing by a digital smoothing filter.
'
' - - - - - - - - - - - - - - - - - - - - - - - - - - - - - - - - -
'
'    2a) Entry (from MAIN CONTROL LOOP upon new transition found in Capture Buffer):
'
F0F0  BC 02 00        WAVE       CPX    #MAXCAPADR
F0F3  25 05                      BCS    WAVE2
F0F5  CE 01 00                   LDX    #MINCAPADR
F0F8  DF 62                      STX    WAVEPTR

WAVE2      EQU    .

F0FA  A6 00                      LDAA   $0,X           ' get transition
F0FC  2A 00                      BPL    WAVE2B         ' was timer or buffer overflow?

F0FE  85 40                      BITA   #$40           ' yes; check for TOFL
F100  26 03                      BNE    WAVE2A
F102  7C 00 AE                   INC    T30MSECFLG     ' set ofl flag F105  EC 02           WAVE2A     LDD    $2,X
F107  DD 64                      STD    WAVETIMEH      ' save current time
F109  20 5F                      BRA    WAVEX9         ' exit F10B  85 40           WAVE2B     BITA   #$40           ' transition timeout?
F10D  26 0E                      BNE    WAVE5

F10F  85 01           WAVE3      BITA   #$01           ' channel 1 (V)?
F111  27 6B                      BEQ    WAVECH2

F113  EC 02                      LDD    $2,X           ' find full cycle
F115  93 6A                      SUBD   WAVE1LST2

F117  1A 83 1A 0A                CPD    #$1A0A         ' < 300 Hz?
F11B  25 03                      BCS    WAVE7
F11D  CC FF FF        WAVE5      LDD    #$FFFF

F120  1A 83 03 A2     WAVE7      CPD    #$3A2          ' > 2150 Hz?
F124  24 03                      BCC    WAVE8
F126  CC F0 00                   LDD    #$F000
F129  DD 66           WAVE8      STD    WAVEPERIOD     ' update period
F12B  4D                         TSTA
F12C  2B 09                      BMI    WAVEX          ' exit if out of range '
'    Process transition, if appropriate
'
```

```
F12E  BD F1 90              JSR    WDIR          ? find direction of sound
F131  BD F1 E4              JSR    WDUTY         ' find duty cycle (voice/tone det)
F134  BD F2 2B              JSR    WFTONE        ' check for 1100 Hz '  Exit
                    '
                    WAVEX     EQU    .
F137  CE 00 7B               LDX    #VOICE1       ' compute silence parameters
F13A  4F                     CLRA
F13B  8D 38                  BSR    QFX1          '   voice < threshold F13D  CE 00 93               LDX    #QUIET1
F140  BD F2 51               JSR    DFILTER
F143  CE 00 81               LDX    #VOICE0
F146  8D 2B                  BSR    QUIETFIX
F148  CE 00 96               LDX    #QUIET0
F14B  BD F2 51               JSR    DFILTER F14E  BD F3 04               JSR    ANALOGIN      ' get analog inputs F151  CE 00 7B     WAVEX1    LDX    #DIGIREGB     ' bump filter regs
F154  0D           WAVEX2    SEC
F155  BD F2 51               JSR    DFILTER
F158  08                     INX
F159  08                     INX
F15A  08                     INX
F15B  8C 00 99               CPX    #DIGIREGB + ($0A * 3)
F15E  25 F4                  BCS    WAVEX2

F160  DE 62                  LDX    WAVEPTR       ' store new transitions
F162  DC 68                  LDD    WAVE1LST1
F164  DD 6A                  STD    WAVE1LST2
F166  EC 02                  LDD    $2,X
F168  DD 68                  STD    WAVE1LST1

WAVEX9    EQU    .
F16A  DE 62                  LDX    WAVEPTR
F16C  08                     INX
F16D  08                     INX
F16E  08                     INX
F16F  08                     INX
F170  DF 62                  STX    WAVEPTR

F172  39                     RTS
                    '
                    '
                    QUIETFIX  EQU    .
F173  A6 03                  LDAA   3,X           ' compare sum of voice + tone with threshold
F175  AB 00        QFX1      ADDA   0,X
F177  A1 04                  CMPA   4,X
F179  07                     TPA
F17A  88 01                  EORA   #$01
F17C  06                     TAP
F17D  39                     RTS
                    '
                    '
                    WAVECH2   EQU    .
F17E  A6 01                  LDAA   $1,X          ' get direction of transition
F180  84 02                  ANDA   #$02
F182  8A 80                  ORAA   #$80          ' combine with ch2 trans flag
F184  97 70                  STAA   WAVE2TRANS
F186  DC 6C                  LDD    WAVE2LST1
F188  DD 6E                  STD    WAVE2LST2
F18A  EC 02                  LDD    $2,X
F18C  DD 6C                  STD    WAVE2LST1
F18E  20 DA                  BRA    WAVEX9
                    '
                    ' - - - - - - - - - - - - - - - - - - - - - - - - - - - -
                    '
                    '  2b)   Directionality Extraction
                    '
                    WDIR      EQU    .
F190  DE 62                  LDX    WAVEPTR
F192  4F                     CLRA
F193  D6 70                  LDAB   WAVE2TRANS    ' check for previous transition in ch2
F195  2A 4A                  BPL    WDIREX        '   if not, set indet flag
F197  7F 00 70               CLR    WAVE2TRANS    ' clear transition flag F19A  54                     LSRB                 '   compute relative transition direction of ch1 & ch2
F19B  E8 01                  EORB   $1,X          '       bit 0 = 1 ==>  opposite phase
F19D  C4 01                  ANDB   #$01          '             = 0 ==>  same phase
F19F  D7 76                  STAB   TEMP00

F1A1  EC 02                  LDD    $2,X          ' find difference of midpoints
F1A3  93 6C                  SUBD   WAVE2LST1
F1A5  D3 58                  ADDD   WAVE1LST1
F1A7  93 5E                  SUBD   WAVE2LST2
F1A9  47                     ASRA                 ' divide by 2
F1AA  56                     RORB F1AB  2A 34        WDIR0     BPL    WDIR1         ' adjust MOD period
F1AD  D3 56                  ADDD   WAVEPERIOD
F1AF  20 FA                  BRA    WDIR0

F1B1  1A 93 66     WDIR1     CPD    WAVEPERIOD
F1B4  25 04                  BCS    WDIR2
F1B6  93 56                  SUBD   WAVEPERIOD
F1B8  20 F7                  BRA    WDIR1

F1BA  DE 56        WDIR2     LDX    WAVEPERIOD    ' compute fraction of period
F1BC  03                     FDIV
F1BD  8F                     XGDX
```

```
F1BE  7D 00 76              TST    TEMPO0        ' modify by relative phase
F1C1  27 02                 BEQ    WDIR4
F1C3  88 80                 EORA   #$80

F1C5  8F         WDIR4      XGDX
                                                 ' X = ( Vmid - Imid ) / Period
                                                 ' Phase diagram of directionality:
                                                 '
                                                 ' |--------|--------|--------|--------|
                                                 '
                                                 ' 0000000......1111111.........0000      | Out/Unknown/In
                                                 '
                                                 ' 0000    4000    8000    C000    FFFF | Phase Angle
                                                 '
                                                 ' Note asymmetric phase shift increase of OUTGOING
                                                 ' vs. INCOMING due to capacitance of phone lines.

F1C6  86 02                 LDAA   #$02
F1C8  BC 38 00               CPX    #$3800        ' aligned?         (Outgoing)
F1CB  25 14                 BCS    WDIREX
F1CD  4F                    CLRA
F1CE  BC 58 00              CPX    #$5800        ' indeterminate?
F1D1  25 0E                 BCS    WDIREX
F1D3  4C                    INCA
F1D4  BC A8 00              CPX    #$A800        ' anti-aligned?    (Incoming)
F1D7  25 08                 BCS    WDIREX
F1D9  4F                    CLRA
F1DA  BC E0 00              CPX    #$E000        ' indeterminate?
F1DD  25 02                 BCS    WDIREX
F1DF  86 02                 LDAA   #$02          ' thus, aligned   (Outgoing).

F1E1  97 7A      WDIREX     STAA   DIRFLG        ' 02 = Outgoing
F1E3  39                    RTS                  ' 01 = Incoming
                                                 ' 00 = Indeterminate '-------------------------------------------------------------
'
'    2c)  Voice/Tone Extraction-- responsive to duty cycle
'
           WDUTY      EQU    .

F1E4  DE 62                 LDX    WAVEPTR
F1E6  EC 02                 LDD    $2,X          ' compute half period
F1E8  93 58                 SUBD   WAVE1LST1
F1EA  DE 56                 LDX    WAVEPERIOD    ' X is full cycle, D is half cycle
F1EC  03                    FDIV
F1ED  8F                    XGDX F1EE  1A 83 80 00           CPD    #$8000        ' fold upper 50% to lower
F1F2  25 05                 BCS    WDT1
F1F4  43                    COMA
F1F5  53                    COMB
F1F6  8F                    XGDX
F1F7  08                    INX
F1F8  8F                    XGDX                 ' negate D
           WDT1       EQU    .                   ' on exit, D = 0000 (assymetric) to 8000 (50%)

F1F9  CE 00 7B              LDX    #VOICE1
F1FC  1A 93 99              CPD    DUTYTHRES     ' compare with duty cycle threshold
F1FF  24 03                 BCC    WDT2          ' compute offset for tone
F201  5F                    CLRB
F202  20 02                 BRA    WDT3          ' compute offset for voice

F204  C6 03      WDT2       LDAB   #$03
F206  3A         WDT3       ABX

F207  DC 56                 LDD    WAVEPERIOD
F209  1A 83 05 35           CPD    #$0535        ' check if > 1500 Hz
F20D  24 06                 BCC    WDT3_B        '   nope, go process F20F  8C 00 7B              CPX    #VOICE1       '   yup, check if voice
F212  26 01                 BNE    WDT3_B
F214  39                    RTS                  '     ifso, exit without doing anything F215  C6 0C      WDT3_B     LDAB   #$0C          ' compute direction offset
F217  96 7A                 LDAA   DIRFLG
F219  85 01                 BITA   #$01
F21B  27 03                 BEQ    WDT5
F21D  5F                    CLRB
F21E  20 06                 BRA    WDT10

F220  85 02      WDT5       BITA   #$02
F222  27 02                 BEQ    WDT10
F224  C6 06                 LDAB   #$06

F226  3A         WDT10      ABX
F227  0C                    CLC
F228  7E F2 51              JMP    DFILTER       ' increment filter reg
'
'-------------------------------------------------------------
'
'    2d)  1100 Hz Extraction
'
           WFTONE     EQU    .

F22B  DE 62                 LDX    WAVEPTR
F22D  A6 00                 LDAA   $0,X          ' get transition
F22F  85 40                 BITA   #$40          ' duration too long?
F231  27 03                 BEQ    WFT0
F233  4F                    CLRA
F234  20 14                 BRA    WFTEX F236  85 01      WFT0       BITA   #$01          ' channel 1?
F238  26 01                 BNE    WFT1
F23A  39                    RTS
```

```
F23B DE 66         WFT1     LDX      WAVEPERIOD     ' compare with frequency window
F23D 4F                     CLRA
F23E 8C 06 F0               CPX      #$6F0          ' > 1126 Hz?
F241 25 C7                  BCS      WFTEX
F243 4C                     INCA
F244 8C C7 44               CPX      #$744          ' < 1075 Hz?
F247 25 C1                  BCS      WFTEX
F249 4F                     CLRA F24A CE C0 8D      WFTEX    LDX      #FAXTONE
F24D 81 C1                  CMPA     #$01
F24F 20 C0                  BRA      DFILTER '
' - - - - - - - - - - - - - - - - - - - - - - - - - - - - - - - - - - -
'
'   2e) Digital smoothing filter
'       Integrates characteristic event detections, while providing a constant
'       decay background.
'
'       (X)       = addr of counter
'       ((X) + 1) = trigger threshold
'       ((X) + 2) = max counter
'
'       uses A
'       triple increments or single decrements ((X)), subject to not-C
'       returns cmpaa of counter with trigger threshold
'
                   DFILTER  EQU      .              ' if C then decr; else incr
F251 24 07                  BCC      DFILINCR
F253 A6 00                  LDAA     $0,X
F255 27 0E                  BEQ      DFILEX
F257 4A                     DECA
F258 20 0B                  BRA      DFILEX DFILINCR EQU      .
F25A A6 00                  LDAA     $0,X
F25C 4C                     INCA                    ' incr counter thrice
F25D 4C                     INCA
F25E 4C                     INCA
F25F A1 02                  CMPA     $2,X           ' check if > maxcntr
F261 25 02                  BCS      DFILEX F263 A6 02                  LDAA     $2,X           ' replace if so
F265 A7 00        DFILEX    STAA     $0,X
F267 A1 01                  CMPA     $1,X           ' compare with threshold
F269 39                     RTS '
'_____
'
'   3) LOW FREQUENCY (30.5 mSEC) PROCESSING ROUTINES
'       Compare smoothed, extracted characteristics with thresholds
'       to derive logical condition flags.  Perform analog histograms,
'       and compare with thresholds.
'
'   3a) Threshold comparisons
'
                   FLAGCHK  EQU      .

F26A C6 10                  LDAB     #$10           ' check DTMF input flag
F26C B6 10 23               LDAA     CAPFLGREG
F26F 84 04                  ANDA     #$04
F271 27 37                  BEQ      FLGC0          ' nope F273 86 04                  LDAA     #$04           ' yup, so reset DTMF
F275 B7 10 23               STAA     CAPFLGREG
F278 D7 90                  STAB     DTMF           -

F27A CE 00 90     FLGC0     LDX      #DTMF
F27D 86 08                  LDAA     #$08
F27F 8D 2B                  BSR      FLGC2

F281 D7 9C                  STAB     SOUNDFLG

F283 CE 00 96               LDX      #QUIETO        ' get quiet flags
F286 86 02                  LDAA     #$02
F288 8D 22                  BSR      FLGC2
F28A D7 9D                  STAB     QUIETFLG '           convert extracted variables to logical condition flags, by
'           comparing with thresholds; add timer alarm conditions
'
F28C BD F2 CB               JSR      FLGTMCHK       ' capture timer alarm conditions in B
F28F 96 9C                  LDAA     SOUNDFLG
F291 84 C8                  ANDA     #$C8           ' capture DTMF, FAXTONE, BEEP
F293 1B                     ABA F294 D6 9C                  LDAB     SOUNDFLG
F296 C4 01                  ANDB     #$01
F298 58                     LSLB
F299 58                     LSLB                    ' capture INVC
F29A 1B                     ABA F29B D6 9D        FLGC1     LDAB     QUIETFLG
F29D 58                     LSLB
F29E 58                     LSLB
F29F 58                     LSLB
F2A0 58                     LSLB
F2A1 C4 30                  ANDB     #$30
F2A3 1B                     ABA                     ' capture QUIETI, QUIETO
F2A4 97 9F                  STAA     FLGLOW F2A6 D6 9F                  LDAB     FLGLOW         ' output diagnostic to SCI port
F2A8 BD C0 00               JSR      SCIWRT
F2AB 39                     RTS
```

```
                          ;
                          ;
F2AC  5F          FLGC2   CLRB
F2AD  97 78               STAA    TEMPO2
F2AF  A6 01       FLGC4   LDAA    $1,X            ' compare each reg with trigger value, save carry
F2B1  A1 00               CMPA    $0,X
F2B3  59                  ROLB F2B4  09                  DEX
F2B5  09                  DEX
F2B6  09                  DEX F2B7  7A 00 78            DEC     TEMPO2          ' done?
F2BA  26 F3               BNE     FLGC4
F2BC  39                  RTS ;
                          ;   set timer alarms
                          ;
                  FLGTM1SET EQU   .               ' set time1 flag
F2BD  CC 00 A4            LDD     #TIME1
F2C0  20 03               BRA     FTS2

FLGTM2SET EQU   .               ' set time2 flag
F2C2  CC 00 A6            LDD     #TIME2

F2C5  8F        FTS2      XGDX                    ' offset time in D; addr in X
F2C6  D3 54               ADDD    WAVETIMEH
F2C8  ED 00               STD     0,X
F2CA  39                  RTS ;
                          ;   check condition of timer alarms
                          ;
                  FLGTMCHK  EQU   .               ' returns LSB of B if time exceeded
F2CB  18 CE 00 00         LDY     #$00
F2CF  DC 54               LDD     WAVETIMEH       ' compare current time with time1
F2D1  1A 93 A4            CPD     TIME1
F2D4  2B 02               BMI     FTC1            ' skip if less than

F2D6  18 08               INY

F2D8  1A 93 A6  FTC1      CPD     TIME2           ' compare current time with time2
F2DB  2B 04               BMI     FTC2            ' skip if less than

F2DD  18 08               INY
F2DF  18 08               INY

F2E1  18 8F     FTC2      XGDY
F2E3  39                  RTS

;---------------------------------------------
                          ;
                          ;    3b)  Analog input routines       -
                          ;
                          ;    Initialize/reset analog input circuitry
                          ;
                  ANALOGINIT EQU  .
F2E4  C6 10               LDAB    #$10            ' setup A/D for single scan, multiple conversions
F2E6  F7 10 30            STAB    ANACTRL F2E9  C6 04               LDAB    #$04            ' reset analog counter
F2EB  D7 1F               STAB    ANACTR F2ED  CC 00 00            LDD     #0000           ' clear analog threshold counters
F2F0  CE 00 AF            LDX     #ANA0

F2F3  ED 00     ANAIT2    STD     $0,X
F2F5  ED 02               STD     $2,X
F2F7  ED 04               STD     $4,X
F2F9  ED 06               STD     $6,X
F2FB  ED 08               STD     $8,X
F2FD  ED 0A               STD     $A,X
F2FF  ED 0C               STD     $C,X
F301  ED 0E               STD     $E,X
F303  39                  RTS

;
                          ;  Check if analog measurements ready, and if so, add to analog histogram buffers
                          ;
                  ANALOGIN  EQU   .
F304  7D 10 30            TST     ANACTRL         ' conversions completed?
F307  2A 4A               BPL     ANARTS F309  CE F3 54            LDX     #ONFHTBL1       ' augment histogram #1
F30C  18 CE 00 AF         LDY     #ANA0
F310  F6 10 32            LDAB    ADR2
F313  8D 1E               BSR     ANATHRESH F315  CE F3 58            LDX     #ONFHTBL2       ' augment histogram #2
F318  18 CE 00 B3         LDY     #ANA1
F31C  F6 10 33            LDAB    ADR3
F31F  8D 12               BSR     ANATHRESH F321  CE F3 5C            LDX     #ONFHTBL3       ' augment histogram #3
F324  18 CE 00 B7         LDY     #ANA2
F328  F6 10 34            LDAB    ADR4
F32B  8D 06               BSR     ANATHRESH F32D  C6 10               LDAB    #$10            ' setup A/D for single scan, multiple conversions
F32F  F7 10 30            STAB    ANACTRL

F332  39                  RTS
```

```
                ;
                ;  Augment analog histogram buffer, at bin computed from offset and bin definitions
                ;
F333 E0 00      ANATHRESH  SUBB    $0,X              '  abs( ana - offset ) to B
F335 24 01                 BCC     ANAT2
F337 50                    NEGB F338 4F         ANAT2      CLRA                      '  if B < first threshold, then exit (A = 0)
F339 E1 01                 CMPB    $1,X
F33B 25 0B                 BCS     ANATI
F33D 4C                    INCA                      '  if B < second threshold, then exit (A = 1)
F33E E1 02                 CMPB    $2,X
F340 25 06                 BCS     ANATI
F342 4C                    INCA                      '  if B < third threshold, then exit (A = 2)
F343 E1 03                 CMPB    $3,X
F345 25 01                 BCS     ANATI
F347 4C                    INCA                      '  thus, B > all thresholds (A = 4)

F348 16         ANATI      TAB                       '  compute histogram bin offset of Y
F349 18 3A                 ABY
F34B 18 6C 00              INC     $0,Y              '  increment histogram bin
F34E 26 03                 BNE     ANARTS
F350 18 6A 00              DEC     $0,Y              '  stop at $FF

F353 39         ANARTS     RTS

;
                ;  Table of analog input offsets and histogram bin definitions
                ;
F354 81 03 0F 2C  ONFHTBL1  DB    $81, $03, $0F, $2C  '  offset, 3 thresholds
F358 2C 0F FF FF  ONFHTBL2  DB    $2C, $0F, $FF, $FF
F35C 00 06 FF FF  ONFHTBL3  DB    $00, $06, $FF, $FF ;
                ;  Table of analog histogram thresholds for each bin
                ;
F360 40 40 10 08  ANA0FL   DB    $40, $40, $10, $08  '  thresholds of histogram bins
F364 30 30 FF FF  ANA1FL   DB    $30, $30, $FF, $FF
F368 30 05 FF FF  ANA2FL   DB    $30, $05, $FF, $FF ;----------------------------------------------------
                ;
                ;  3c) Threshold comparisons of analog histograms, to determine status of
                ;      external lines
                ;
                OFANCHK    EQU     .

F36C 7A 00 BF              DEC     ANACTR            '  check if number of cycles complete
F36F 2A E2                 BPL     ANARTS '  compute ANAFLG, as follows:
                                                     '
                                                     '  MSB:   ringing           80
                                                     '         dialing           40
                                                     '         onhook            20
                                                     '         offhook           10
                                                     '         disconnected      08
                                                     '         channel 2 offhook 04
                                                     '         fax offhook       02
                                                     '  LSB:   (unused)

F371 CE 00 AF              LDX     #ANA0             '  get histogram of channel 1
F374 18 CE F3 60           LDY     #ANA0FL
F378 8D 58                 BSR     ANACHKFL F37A C6 80                 LDAB    #$80
F37C 81 07                 CMPA    #$07
F37E 24 10                 BCC     OFA4              '  ringing?

F380 54                    LSRB
F381 81 06                 CMPA    #$06
F383 24 0B                 BCC     OFA4              '  pulse dialing?

F385 54                    LSRB
F386 81 04                 CMPA    #$04
F388 24 06                 BCC     OFA4              '  onhook?

F38A 54                    LSRB
F38B 81 02                 CMPA    #$02
F38D 24 01                 BCC     OFA4              '  offhook?

F38F 54                    LSRB                      '  must be disconnected
F390 D7 9E      OFA4       STAB    ANAFLG F392 CE 00 B3              LDX     #ANA1             '  get histogram of channel 2
F395 18 CE F3 64           LDY     #ANA1FL
F399 8D 37                 BSR     ANACHKFL
F39B C6 04                 LDAB    #$04              '  channel 2 offhook?
F39D 81 02                 CMPA    #$02
F39F 24 01                 BCC     OFA6
F3A1 5F                    CLRB F3A2 DA 9E      OFA6       ORAB    ANAFLG
F3A4 D7 9E                 STAB    ANAFLG F3A6 CE 00 B7              LDX     #ANA2             '  get histogram of channel 3
F3A9 18 CE F3 68           LDY     #ANA2FL
F3AD 8D 23                 BSR     ANACHKFL
F3AF C6 02                 LDAB    #$02
F3B1 85 02                 BITA    #$02              '  fax offhook?
F3B3 27 01                 BEQ     OFA8              '    yes, if high voltage not present
F3B5 5F                    CLRB F3B6 DA 9E      OFA8       ORAB    ANAFLG
F3B8 D7 9E                 STAB    ANAFLG F3BA 20 13                 BRA     OFA9              '  skip display of flags
F3BC 01                    NOP
```

```
F3BD  CE 00 9C              LDX     #SOUNDFLG       ' display flags
F3C0  BD F8 E5              JSR     DISC2BSP
F3C3  CE 00 9E              LDX     #ANAFLG
F3C6  BD F8 F5              JSR     DIS2BSP
F3C9  CE 00 A2              LDX     #FLGADDR
F3CC  BD F8 F5              JSR     DIS2BSP F3CF  7E F2 E4      OFA9    JMP     ANALOGINIT      ' clear histogram buffers
                    ;
                    ;
                    ;
F3D2  5F            ANACHKFL CLRB
F3D3  18 A6 03              LDAA    3,Y             ' compare with threshold, save carry bit
F3D6  A1 03                 CMPA    3,X
F3D8  59                    ROLB
F3D9  18 A6 02              LDAA    2,Y
F3DC  A1 02                 CMPA    2,X
F3DE  59                    ROLB
F3DF  18 A6 01              LDAA    1,Y
F3E2  A1 01                 CMPA    1,X
F3E4  59                    ROLB
F3E5  18 A6 00              LDAA    0,Y
F3E8  A1 00                 CMPA    0,X
F3EA  59                    ROLB
F3EB  17                    TBA
F3EC  39                    RTS ;------------------------------------------------------------------
                    ;
                    ;    4) MAIN CONTROL LOOP
                    ;       Checks Capture Buffer for new event (including 30.5 msec flag)
                    ;       and jumps to High Frequency or Low Frequency Routines to
                    ;       process the event. Compares resulting logical condition flags
                    ;       with the desired condition flags. If match, jumps to State
                    ;       Machine routines to process the state change event. Else,
                    ;       checks if new character to be displayed, and if so, JSR's to
                    ;       display routines. Then, recycles loop.
                    ;
                    MAINLOOP EQU    .
F3ED  DE 62                 LDX     WAVEPTR         ' check if new transitions
F3EF  9C 60                 CPX     CAPBUFPTR
F3F1  27 1D                 BEQ     MLOOP2          ' nope F3F3  BD F0 F0              JSR     WAVE            ' process transition
F3F6  7D 00 AE              TST     T30MSECFLG      ' check if 30.5 msec tick
F3F9  27 15                 BEQ     MLOOP2
F3FB  7F 00 AE              CLR     T30MSECFLG      ' reset flag F3FE  BD F2 6A              JSR     FLAGCHK
F401  BD F3 6C              JSR     OFANCHK
F404  DC 40                 LDD     FLGCONDTN       ' is flgcondtn satisfied?
F406  94 9E                 ANDA    FLGHIGH
F408  D4 9F                 ANDB    FLGLOW
F40A  1B                    ABA
F40B  27 03                 BEQ     MLOOP1          ' nope F40D  7E F4 38              JMP     STATEPROC       ' yes; go on to process it MLOOP1
F410  BD F8 6F      MLOOP2  JSR     DISPNXT         ' display next char, if pending
F413  20 D8                 BRA     MAINLOOP ;------------------------------------------------------------------
                    ;
                    ;    5) FAXTRAN STATE MACHINE
                    ;
                    ;  Condition flags:
                    ;
                    FLGRING     EQU   $8000
                    FLGOWNHK    EQU   $2000
                    FLGOFFHK    EQU   $1000
                    FLGANSOFH   EQU   $0400
                    FLGFAXOFH   EQU   $0200
                    ;
                    FLGINREMOT  EQU   $0080
                    FLGINFAXTN  EQU   $0040
                    FLGOUTQUIET EQU   $0020
                    FLGINQUIET  EQU   $0010
                    ;
                    FLGOUTBEEP  EQU   $0008
                    FLGINVC     EQU   $0004
                    FLGTIME2    EQU   $0002
                    FLGTIME1    EQU   $0001
                    ;
                    ;
                    ;  Drivers (Port D):
                    ;
                    CLKON       EQU   $20
                    RNGON       EQU   $10
                    ANSOFFINV   EQU   $08
                    FAXONINV    EQU   $04
                    ;
                    ;
                    ;  Basic modes of operation:
                    ;
                    ANSONLY     EQU   $01
                    FAXONLY     EQU   $02
                    AUTOFAX     EQU   $03
                    ;
                    ;  Format for control blocks in state machine:
```

```
                    JSR     SETSTATE            ' call to establish state
                    DB      $00                 ' zero if nothing to display;
                                                '   else, 2 byte addr of message
                    DW      COMBINED_FLG        ' composite ('OR') of all desired flags
                    DW      FLG1, ADDR1         ' individual desired flags, and addr to go to
                    DW      FLG2, ADDR2
                            "
                            "
                    DW      FLGn, ADDRn
                    DW      $0000               ' end of control block '-------------------------------------------------------------------
'
'   Initialize/reset control state
'
          SETSTATE  EQU     .

F415 38             PULX                        ' get addr of flgtable from stack F416 EC 00          LDD     0,X                 ' display message if any
F418 2B 0F          BMI     STST2

F41A 4D             TSTA                        ' else, skip if A = 0;
F41B 27 0F          BEQ     STST3

F41D DF 76          STX     TEMP00              ' else, display address if A <> 0
F41F CE 00 76       LDX     #TEMP00
F422 BD F8 E5       JSR     DISC2BSP
F425 DE 76          LDX     TEMP00
F427 20 03          BRA     STST3

F429 DD C0  STST2   STD     DISPTR              ' incr extra byte for message addr
F42B 08             INX F42C 08     STST3   INX                         ' incr single byte (no message addr)

F42D EC 00          LDD     0,X
F42F DD A0          STD     FLGCONDTN           ' get flag triggers
F431 08             INX
F432 08             INX F433 DF A2          STX     FLGADDR             ' save state address
F435 7E F3 ED       JMP     MAINLOOP            ' goto tight loop '-------------------------------------------------------------------
'
'   Figure out which condition was triggered, and go to state machine to process
'
          STATEPROC EQU     .
F438 DE A2          LDX     FLGADDR F43A EC 00  CHKST4  LDD     0,X                 ' get next flag to check
F43C 26 02          BNE     CHKST6              '   no more flags?
F43E 20 AD          BRA     MAINLOOP            '   return to loop F440 94 9E  CHKST6  ANDA    FLGHIGH             ' this flag triggered?
F442 D4 9F          ANDB    FLGLOW
F444 1B             ABA
F445 27 05          BEQ     CHKST8              ' not this one, get next one
F447 EC 02          LDD     2,X                 ' match-- this one caused trigger; get addr
F449 8F             XGDX
F44A 3C             PSHX
F44B 39             RTS                         ' go to state machine to process F44C 08     CHKST8  INX                         ' increment to next flag
F44D 08             INX
F44E 08             INX
F44F 08             INX
F450 20 E8          BRA     CHKST4

'-------------------------------------------------------------------
'
'   Initial/Quiescent State
'
          ONHK      EQU     .

F452 86 0C          LDAA    #0C                 ' clear drivers:
                                                '       20  CLKON
                                                '       10  RNGON
                                                '       08  ANSOFFINV
                                                '       04  FAXONINV
F454 B7 10 08       STAA    PORTD
F457 86 1C          LDAA    #1C
F459 B7 10 09       STAA    PORTDDIR

F45C CE F9 4B       LDX     #M_FAXTRAN
F45F DF C0          STX     DISPTR

F461 CE 00 10       LDX     #$10                ' delay 488 msec for relays to reset
F464 BD F6 0E       JSR     STATEDELAY F467 7F 00 AC ONHK2 CLR     FAXTONDET           ' clear flag for faxtone detected
F46A 86 03          LDAA    #$03                ' set max DTMF pulses to get fax
F46C 97 AD          STAA    DTMFCTR F46E 96 9B          LDAA    ONHKMD              ' which mode?
F470 81 03          CMPA    #AUTOFAX
F472 27 22          BEQ     ONHKAF

F474 81 02          CMPA    #FAXONLY
F476 27 11          BEQ     ONHKFO
```

```
F478  81 01                       CMPA   #ANSONLY
F47A  27 03                       BEQ    ONNHKAO
F47C  BD F9 33                    JSR    ERROR
            '
            '
            '
                        ONNHKAO   EQU    .                 ' ANS only mode
F47F  86 04                       LDAA   #$04              ' ANS on; FAX off
F481  B7 10 08                    STAA   PORTD
F484  BD F4 93                    JSR    CHANGEMODE        ' change in mode?
F487  20 F6                       BRA    ONNHKAO           ' nope
                        ONNHKFO   EQU    .                 ' FAX only mode
F489  86 08                       LDAA   #$08              ' FAX on; ANS off
F48B  B7 10 08                    STAA   PORTD
F48E  BD F4 93                    JSR    CHANGEMODE        ' change in mode?
F491  20 F6                       BRA    ONNHKFO           ' nope
            '
            '
            '
                        CHANGEMODE EQU   .
            '
            '           (check if change of mode switch (or touch tones) actuated,
            '           while prompting user through LCD display; ifso, change
            '           ONNHKMD accordingly, then:)
F493  7E F4 52                    JMP    ONNHK
            '
            '
            '
                        ONNHKAF   EQU    .
F496  BD F4 15                    JSR    SETSTATE
F499  00                          DB     $00
F49A  92 C0                       DW     FLGOFFHK + FLGFAXOFH + FLGRING
F49C  10 C0 F4 B1                 DW     FLGOFFHK,INUSE1
F4A0  80 C0 F4 D8                 DW     FLGRING,RINGING
F4A4  02 C0 F5 FB                 DW     FLGFAXOFH,ACTFAXON
F4A8  00 C0                       DW     $0000
            '
            ' - - - - - - - - - - - - - - - - - - - - - - - - - - - - - - - - - -
            '
                        REMOTE    EQU    .
F4AA  CE F9 7C                    LDX    #M_REMOTE
F4AD  DF C0                       STX    DISPTR
F4AF  20 05                       BRA    INUSE1A
                        INUSE1    EQU    .
F4B1  CE F9 61                    LDX    #M_INUSE1
F4B4  DF C0                       STX    DISPTR
F4B6  BD F4 15        INUSE1A     JSR    SETSTATE
F4B9  00                          DB     $00
F4BA  20 00                       DW     FLGONNHK
F4BC  20 00 F4 C2                 DW     FLGONNHK,INUSE1PS
F4C0  00 00                       DW     $0000
                        INUSE1PS  EQU    .                 ' delay for return to ONNHK (for pulse dialing)
F4C2  CE 00 05                    LDX    #$05              ' 152.5 msec
F4C5  BD F2 BD                    JSR    FLGTM1SET
F4C8  BD F4 15                    JSR    SETSTATE
F4CB  00                          DB     $00
F4CC  10 01                       DW     FLGOFFHK + FLGTIME1
F4CE  10 00 F4 B6                 DW     FLGOFFHK,INUSE1A
F4D2  00 01 F4 52                 DW     FLGTIME1,ONNHK
F4D6  00 00                       DW     $0000
            '
            '
                        RINGING   EQU    .
F4D8  4F                          CLRA
F4D9  97 AA                       STAA   RINGCTR + 1
F4DB  7C 00 AA        RNGA        INC    RINGCTR + 1       ' ring voltage present
F4DE  BD F4 15                    JSR    SETSTATE
F4E1  F9 F4                       DW     M_RINGING
F4E3  30 00                       DW     FLGOFFHK + FLGONNHK
F4E5  10 00 F5 0F                 DW     FLGOFFHK,RINGPS
F4E9  20 00 F4 EF                 DW     FLGONNHK,RNGB
F4ED  00 00                       DW     $0000
                        RNGB      EQU    .                 ' pause between rings
F4EF  CE 00 A9                    LDX    #RINGCTR          ' display # of rings
F4F2  BD FB E5                    JSR    DISC2BSP
F4F5  CE 00 83        RNGB2       LDX    #$83              ' 131 * 30.5 msec = 4 sec delay
F4F8  BD F2 BD                    JSR    FLGTM1SET         ' for reset to ONNHK
F4FB  BD F4 15                    JSR    SETSTATE
F4FE  00                          DB     $00
F4FF  90 01                       DW     FLGOFFHK + FLGRING + FLGTIME1
F501  10 00 F5 0F                 DW     FLGOFFHK,RINGPS
F505  80 00 F4 DB                 DW     FLGRING,RNGA
F509  00 01 F4 52                 DW     FLGTIME1,ONNHK
F50D  00 00                       DW     $0000
            '
                        RINGPS    EQU    .
F50F  BD F4 15                    JSR    SETSTATE
F512  00                          DB     $00
F513  30 00                       DW     FLGONNHK + FLGOFFHK
```

```
F515  20 00 F4 52              DW    FLGONNHK,ONNHK
F519  10 00 F5 1F              DW    FLGOFFHK,RINGPSA
F51D  00 00                    DW    $0000

RINGPSA  EQU   .
F51F  CE 00 08            LDX   #$0008              ' pause 244 msec
F522  BD F6 0E            JSR   STATEDELAY INUSE2   EQU   .                   ' Answered by ANS or external tel set F525  CE 02 90            LDX   #$0290              ' set alarm for 656 * 30.5 msec = 20 sec
F528  BD F2 C2            JSR   FLGTM2SET
F52B  DE 64               LDX   WAVETIMEH           ' save current time
F52D  DF A4               STX   TIME1

F52F  BD F4 15   INUSE2A  JSR   SETSTATE
F532  F9 6E               DW    M_INUSE2
F534  24 C2               DW    FLGTIME2 + FLGONNHK + FLGINFAXTN + FLGANSOFH + FLGINREMOT
F536  00 02 F4 81         DW    FLGTIME2,INUSE1     ' 20 sec timeout; thus no FAX
F53A  20 00 F4 52         DW    FLGONNHK,ONNHK
F53E  00 40 F5 4C         DW    FLGINFAXTN,INUSE2B
F542  04 00 F5 62         DW    FLGANSOFH,OGM
F546  00 80 F5 5A         DW    FLGINREMOT,INUSE2D
F54A  00 00               DW    $0000

INUSE2B  EQU   .                   ' Faxtone det
F54C  8D 32               BSR   FAXTNINC            ' set faxtone flag F54E  DC 64      INUSE2C  LDD   WAVETIMEH           ' more than 2 sec since start of state?
F550  93 A4               SUBD  TIME1
F552  1A 83 00 40         CPD   #$0040
F556  25 07               BCS   MNLOOP              ' no; return to state
F558  20 52               BRA   GETFAXT             ' yes; ans not on so getfax INUSE2D  EQU   .                   ' DTMF detected
F55A  7A 00 AD            DEC   DTMFCTR             '   Nth DTMF?
F55D  27 4D               BEQ   GETFAXT             '   yup-- so getfax
F55F  7E F3 ED   MNLOOP   JMP   MAINLOOP            '   nope-- continue to wait
                 '
                 '        (Note-- can add other routines to actuate FAX, e.g., specific DTMF
                 '        pattern; specific voice pattern; silence for particular length of
                 '        time; etc.)
                 '
                 '
                 '
                 OGM      EQU   .
F562  BD F4 15            JSR   SETSTATE
F565  F9 EA               DW    M_OUTGOING
F567  20 C8               DW    FLGONNHK + FLGOUTBEEP + FLGINFAXTN + FLGINREMOT
F569  20 00 F4 52         DW    FLGONNHK,ONNHK
F56D  00 08 F5 94         DW    FLGOUTBEEP,ICMPS
F571  00 40 F5 7B         DW    FLGINFAXTN,OGMFAXTN
F575  00 80 F4 AA         DW    FLGINREMOT,REMOTE
F579  00 00               DW    $0000

OGMFAXTN EQU   .
F57B  8D 03               BSR   FAXTNINC            ' set faxtone flag
F57D  7E F3 ED            JMP   MAINLOOP FAXTNINC EQU   .                   ' set faxtone flag
F580  7C 00 AC            INC   FAXTONDET
F583  26 03               BNE   FXTNIC2
F585  7A 00 AC            DEC   FAXTONDET
F588  D6 A1      FXTNIC2  LDAB  FLGCONDTN + 1       ' clear faxtone from FLGCONDTN
F58A  C4 3F               ANDB  #$FF - FLGINFAXTN
F58C  D7 A1               STAB  FLGCONDTN + 1
F58E  CE F9 89            LDX   #M_FAXTONDET        ' display message
F591  DF C0               STX   DISPTR
F593  39                  RTS
                 '
                 '
                 ICMPS    EQU   .
F594  BD F4 15            JSR   SETSTATE
F597  00                  DB    $00
F598  20 20               DW    FLGOUTQUIET + FLGONNHK
F59A  20 00 F4 52         DW    FLGONNHK,ONNHK
F59E  00 20 F5 A4         DW    FLGOUTQUIET,ICM
F5A2  00 00               DW    $0000
                 '
                 '
                 ICM      EQU   .
F5A4  7F 00 93            CLR   QUIETI              * clear inquiet filter reg
F5A7  CE F9 E0            LDX   #M_INCOMING
F5AA  DF C0               STX   DISPTR

F5AC  4F         GETFAXT  CLRA

F5AD  97 AB      GETFX    STAA  FAXRINGCTR
F5AF  81 35               CMPA  #$35                ' fax not responding?
F5B1  25 09               BCS   GETFX1
F5B3  8B 04               SUBA  #$04                ' bump ring counter by 4
F5B5  97 AB               STAA  FAXRINGCTR
F5B7  CE F9 CE            LDX   #M_FAXNORESP
F5BA  DF C0               STX   DISPTR              ' display message

F5BC  BD F6 5E   GETFX1   JSR   FAXRING

F5BF  CE 00 18   GETFX2   LDX   #$0018              ' 732 msec = 1/4 fax ring cycle
F5C2  BD F2 BD            JSR   FLGTM1SET F5C5  BD F4 15   GETFX3   JSR   SETSTATE
F5C8  00                  DB    $00
F5C9  22 45               DW    FLGINVC + FLGINFAXTN + FLGFAXOFH + FLGONNHK + FLGTIME1
```

```
F5CB  02 00 F6 1E              DW      FLGFAXOFH,ACTFAX
F5CF  20 00 F4 52              DW      FLGONNHK,ONNHK
F5D3  00 01 F5 E1              DW      FLGTIME1,GETFX5
F5D7  00 40 F5 E6              DW      FLGINFAXTN,GETFX8
F5DB  00 04 F5 EB              DW      FLGINVC,GETFXA
F5DF  00 00                    DW      $0000

F5E1  96 4B        GETFX5      LDAA    FAXRINGCTR
F5E3  4C                       INCA
F5E4  20 C7                    BRA     GETFX

F5E6  BD 58        GETFX8      BSR     FAXTNINC        ' set faxtone flag
F5E8  7E F3 ED                 JMP     MAINLOOP F5EB  96 4B        GETFXA      LDAA    FAXRINGCTR
F5ED  7D 00 AC                 TST     FAXTONDET       ' if faxtone previously detected, ignore in-voices
F5F0  26 EB                    BNE     GETFX
                                                       ' else, clear fax ringing & goto inuse1
F5F2  4F                       CLRA
F5F3  C6 30                    LDAB    #RNGON + CLKON
F5F5  BD F6 95                 JSR     PORTD_ACT
F5F8  7E F4 81                 JMP     INUSE1

ACTFAXON    EQU     .

F5FB  CC 00 1C                 LDD     #$001C          ' stop ring; turn on fax and turn off ans
F5FE  BD F6 95                 JSR     PORTD_ACT F601  CE 00 10                 LDX     #$0010          ' 488 msec delay for relays to move
F604  BD 0E                    BSR     STATEDELAY F606  CE F9 97                 LDX     #M_FAXOFH
F609  DF C0                    STX     DISPTR
F60B  7E F4 C2                 JMP     INUSE1PS        ' wait for fax done F60E  BD F2 BD     STATEDELAY  JSR     FLGTM1SET       ' delay by amount in X F611  BD F4 15                 JSR     SETSTATE
F614  00                       DB      $00
F615  00 01                    DW      FLGTIME1
F617  00 01 F6 1D              DW      FLGTIME1,STDLY2
F61B  00 00                    DW      $0000

F61D  39           STDLY2      RTS

ACTFAX      EQU     .

F61E  BD F6 A9                 JSR     FAXON           ' turn ON fax; turn OFF ring voltage F621  CE F9 84                 LDX     #M_FAXBYTON     ' display method for detecting FAX
F624  7D 00 AC                 TST     FAXTONDET       '   by calling tone?
F627  26 0B                    BNE     ACTFX2          '   br ifso F629  CE F9 C1                 LDX     #M_FAXBYDTMF
F62C  7D 00 AD                 TST     DTMFCTR         '   by DTMF?
F62F  27 03                    BEQ     ACTFX2          '   br ifso F631  CE F9 A4                 LDX     #M_FAXBYSIL
F634  DF C0        ACTFX2      STX     DISPTR F636  CE 00 84                 LDX     #$0084          ' 4 sec delay for max time to shut OFF ANS
F639  BD F2 C2                 JSR     FLGTM2SET F63C  BD F4 15                 JSR     SETSTATE
F63F  00                       DB      $00
F640  20 0A                    DW      FLGTIME2 + FLGOUTBEEP + FLGONNHK
F642  00 02 F6 56              DW      FLGTIME2,ACTFX6
F646  00 08 F6 50              DW      FLGOUTBEEP,ACTFX4
F64A  20 00 F6 56              DW      FLGONNHK,ACTFX6
F64E  00 00                    DW      $0000

F650  CE 00 08     ACTFX4      LDX     #$0008          ' wait 244 msec, then shut off ANS
F653  BD F6 0E                 JSR     STATEDELAY F656  CC 00 08     ACTFX6      LDD     #$0000 + ANSOFFINV ' shut off ANS
F659  BD 3A                    BSR     PORTD_ACT
F65B  7E F4 C2                 JMP     INUSE1PS F65E  84 03        FAXRING     ANDA    #$03            ' FAXRINGCTR = 00 mod 4?
F660  27 02                    BEQ     FXRNG2
F662  8A FF                    ORAA    #$FF            ' no; stop ring to fax
F664  4C           FXRNG2      INCA                    ' A = 1 ==> 00 mod 4
                                                       '     0 ==> 01 - 03 mod 4
F665  36                       PSHA                    ' save A
F666  C6 10                    LDAB    #RNGON
F668  BD 2B                    BSR     PORTD_ACT       ' bit 0: turn ON or shut OFF ring voltage to fax
F66A  32                       PULA                    ' if = 0 MOD 4, then CLICK
F66B  26 01                    BNE     CLKGEN
F66D  39                       RTS

CLKGEN      EQU     .

F66E  86 3C                    LDAA    #$3C            ' enable output
F670  B7 10 09                 STAA    PORTDDIR
F673  CC 55 11                 LDD     #$5511          ' click pattern
F676  DD 78                    STD     TEMPO2
```

```
F678  CC 00 20    CLKGN2    LDD    #$00 + CLKON
F67B  74 00 78              LSR    TEMPO2              ' move next bit to A
F67E  76 00 79              ROR    TEMPO2 + 1
F681  49                    ROLA
F682  8D 11                 BSR    PORTD_ACT           ' execute click F684  CE 0A 00              LDX    #$0A00              ' wait 3.84 msec
F687  BD F9 2F              JSR    DELAY F68A  7D 00 79    CLKGN4    TST    TEMPO2 + 1          ' all bits in pattern done?
F68D  26 E9                 BNE    CLKGN2

F68F  86 1C                 LDAA   #$1C                ' disable output
F691  B7 10 09              STAA   PORTDDIR
F694  39                    RTS
                  '
                  '
                  PORTD_ACT EQU    .                   ' A = 00 ==> RESET port D by (B)
                                                       '     01 ==> SET   port D by (B)
F695  4D                    TSTA                       ' check (A) for SET or RESET
F696  27 05                 BEQ    PDS2

F698  FA 10 08              ORAB   PORTD               ' SET (B)
F69B  20 04                 BRA    PDS4

F69D  53          PDS2      COMB
F69E  F4 10 08              ANDB   PORTD               ' RESET (B)
F6A1  F7 10 08    PDS4      STAB   PORTD

F6A4  39                    RTS
                  '
                  '
                  '
                  FAXOFF    EQU    .
F6A5  86 01                 LDAA   #$01
F6A7  20 01                 BRA    FAXON + 1

FAXON     EQU    .
F6A9  4F                    CLRA
F6AA  C6 14                 LDAB   #FAXONINV + RNGON
F6AC  20 E7                 BRA    PORTD_ACT
                  '
                  '-----------------------------------------------
                  '
                  '   DISPLAY ROUTINES
                  '
                  '
                  DISPORT   EQU    $1003               ' port C
                  DISPDIR   EQU    $1007               ' data direction for port C
                  '
                  '
                  '
                            ORG    $F800
                  DISPINIT  EQU    .
                            (remainder of code deleted from this listing)
                  '
                  '- - - - - - - - - - - - - - - - - - - - - - - -
                  '
F92F  09          DELAY     DEX                        ' delay = X * 1.5 usec
F930  26 FD                 BNE    DELAY
F932  39                    RTS
                  '
                  '          ERROR MESSAGE
                  '
                  ERROR     EQU    .
F933  30                    TSX                        ' get addr of error
F934  BD F8 E5              JSR    DISC2BSP            ' place in display buffer F937  CE F9 5A              LDX    #M_ERROR            ' add "ERROR" + 00
F93A  A6 00       ERROR1    LDAA   0,X
F93C  18 A7 00              STAA   0,Y
F93F  27 05                 BEQ    ERROREX
F941  08                    INX
F942  18 08                 INY
F944  20 F4                 BRA    ERROR1

F946  BD F8 6F    ERROREX   JSR    DISPWT
F949  20 FB                 BRA    ERROREX             ' freeze '
                  '-----------------------------------------------
                  '
                  '          MESSAGES
                  '
F94B  0A          M_FAXTRAN DB     0A
F94C  20 46 41 58 54        DS     " FAXTRAN-- II"
      52 41 4E 2D 2D
      20 49 49
F959  00                    DB     00
```

```
F95A  20                M_ERROR    DB   20
F95B  45 52 52 4F 52               DS   "ERROR"
F960  00                           DB   00

F961  0A                M_INUSE1   DB   0A
F962  4C 49 4E 45 20               DS   "LINE IN USE"
      49 4E 20 55 53
      45
F96D  00                           DB   00

F96E  0A                M_INUSE2   DB   0A
F96F  54 45 4C 20 41               DS   "TEL ANSWERED"
      4E 53 57 45 52
      45 44
F97B  00                           DB   00

F97C  0A                M_REMOTE   DB   0A
F97D  52 45 4D 4F 54               DS   "REMOTE CTRL"
      45 20 43 54 52
      4C
F988  00                           DB   00

F989  0A                M_FAXTONDET DB  0A
F98A  46 41 58 20 54               DS   "FAX TONE DET"
      4F 4E 45 20 44
      45 54
F996  00                           DB   00

F997  0A                M_FAXOFH   DB   0A
F998  46 41 58 20 4F               DS   "FAX OFFHOOK"
      46 46 48 4F 4F
      4B
F9A3  00                           DB   00

F9A4  0A                M_FAXBYSIL DB   0A
F9A5  46 41 58 20 62               DS   "FAX by Silence"
      79 20 53 69 6C
      65 6E 63 65
F9B3  00                           DB   00

F9B4  0A                M_FAXBYTON DB   0A
F9B5  46 41 58 20 62               DS   "FAX by Tone"
      79 20 54 6F 6E
      65
F9C0  00                           DB   00

F9C1  0A                M_FAXBYDTMF DB  0A
F9C2  46 41 58 20 62               DS   "FAX by DTMF"
      79 20 44 54 4D
      46
F9CD  00                           DB   00

F9CE  0A                M_FAXNORESP DB  0A
F9CF  46 41 58 20 64               DS   "FAX disconnected"
      69 73 63 6F 6E
      6E 65 63 74 65
      64
F9DF  00                           DB   00

F9E0  0A                M_INCOMING DB   0A
F9E1  49 4E 43 4F 4D               DS   "INCOMING"
      49 4E 47
F9E9  00                           DB   00

F9EA  0A                M_OUTGOING DB   0A
F9EB  4F 55 54 47 4F               DS   "OUTGOING"
      49 4E 47
F9F3  00                           DB   00

F9F4  0A                M_RINGING  DB   0A
F9F5  52 49 4E 47 49               DS   "RINGING "
      4E 47 20
F9FD  00                           DB   00

F9FE  0A                M_BLANK    DB   0A
F9FF  00                           DB   00
```

What is claimed is:

1. Method for determining a directionality of at least one signal on a communication channel comprising:
deriving at least two independent signals from said communication channel;
analyzing said independent signals to derive at least one numerical value representing a relative phase of said independent signals; wherein said numerical value comprises multiple bits; and classifying said at least one numerical value to determine a directionality of said at least one signal.

2. The method of claim 1 for determining a directionality of at least one signal on a communication channel, wherein said step of analyzing comprises a plurality of substeps of analyzing said independent signals to derive a plurality of numerical subvalues representing at least one instantaneous relative phase of said independent signals, followed by at least one step of digitally smoothing the numerical subvalues to produce said at least one numerical value representing a relative phase of said independent signals.

3. The method of claim 1 for determining a directionality of at least one signal on a communication channel, wherein said step of classifying said at least one numerical value comprises comparing said at least one numerical value with a threshold.

4. The method of claim 7 for determining a directionality of at least one signal on a communication channel, wherein said step of classifying said at least one numerical value comprises comparing said at least one numerical value with a plurality of values indicating a plurality of directionality conditions, and deriving thereby data representing a directionality condition.

5. The method of claim 4 for determining a directionality of at least one signal on a communication channel, wherein said plurality of values includes at least one range wherein said directionality condition is "indeterminate".

6. Method for determining a directionality of at least one signal on a communication channel comprising:

deriving at least two independent signals from said communication channel;

analyzing said independent signals to derive at least one numerical value representing a relative phase of said independent signals; wherein said numerical value comprises multiple bits; and classifying said at least one numerical value by comparing with a plurality of values to determine a directionality condition of said at least one signal.

7. The method of claim 6 for determining a directionality of at least one signal on a communication channel, wherein said step of analyzing comprises a plurality of substeps of analyzing said independent signals to derive a plurality of numerical subvalues representing at least one instantaneous relative phase of said independent signals, followed by at least one step of digitally smoothing the numerical subvalues to produce said at least one numerical value representing a relative phase of said independent signals.

8. The method of claim 6 for determining a directionality of at least one signal on a communication channel, wherein said plurality of values includes at least one range wherein said directionality condition is "indeterminate".

9. Method for determining a directionality of at least one signal on a multidirectional communication channel comprising:

deriving a plurality of independent signals from said communication channel;

analyzing said independent signals to derive numerical values representing relative phases of said independent signals; wherein said numerical values comprise multiple bits; and classifying said numerical values by comparing with a plurality of values to determine a directionality condition of said at least one signal.

10. The method of claim 9 for determining a directionality of at least one signal on a communication channel, wherein said step of analyzing comprises a plurality of substeps of analyzing said independent signals to derive a plurality of numerical subvalues representing instantaneous relative phases of said independent signals, followed by at least one step of digitally smoothing the numerical subvalues to produce said numerical values representing relative phases of said independent signals.

11. The method of claim 9 for determining a directionality of at least one signal on a multidirectional communication channel, wherein said plurality of values includes at least one range wherein said directionality condition is "indeterminate".

* * * * *